(12) United States Patent
Li et al.

(10) Patent No.: US 11,961,405 B2
(45) Date of Patent: Apr. 16, 2024

(54) PROTOCOL DESIGN FOR UNMANNED AERIAL SYSTEM (UAS) TRAFFIC MANAGEMENT (UTM)

(71) Applicant: INTERDIGITAL PATENT HOLDINGS, INC., Wilmington, DE (US)

(72) Inventors: Jun Li, Cranbury, NJ (US); Nagi Mahalingam, San Diego, CA (US); Anantharaman Balasubramanian, San Diego, CA (US); Ravikumar V. Pragada, Warrington, PA (US); Michel Roy, Candiac (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 544 days.

(21) Appl. No.: 16/756,723

(22) PCT Filed: Oct. 16, 2018

(86) PCT No.: PCT/US2018/056066
§ 371 (c)(1),
(2) Date: Apr. 16, 2020

(87) PCT Pub. No.: WO2019/079286
PCT Pub. Date: Apr. 25, 2019

(65) Prior Publication Data
US 2020/0250993 A1    Aug. 6, 2020

Related U.S. Application Data

(60) Provisional application No. 62/572,939, filed on Oct. 16, 2017.

(51) Int. Cl.
*G08G 5/00* (2006.01)
*B64C 39/02* (2023.01)
(Continued)

(52) U.S. Cl.
CPC ......... *G08G 5/0013* (2013.01); *B64C 39/024* (2013.01); *G01C 21/12* (2013.01);
(Continued)

(58) Field of Classification Search
None
See application file for complete search history.

(56) References Cited

U.S. PATENT DOCUMENTS 9,224,302 B1    12/2015  Young et al.
9,613,536 B1 *  4/2017   Wolford ............... G08G 5/0026
(Continued)

FOREIGN PATENT DOCUMENTS

CN    106403995    2/2017
EP    2 182 325    5/2010
(Continued)

OTHER PUBLICATIONS

Aimar, "Required navigation performance for improved flight operations and efficient use of airspace," Newsletter, Aerospace Online (Oct. 26, 2000) available at https://www.aerospaceonline.com/doc/required-navigation-performance-for-improved-0001.

(Continued)

*Primary Examiner* — Christian Chace
*Assistant Examiner* — Shayne M. Gilbertson
(74) *Attorney, Agent, or Firm* — VOLPE KOENIG

(57) ABSTRACT

An unmanned aerial system (UAS) may execute a mission planned by a UAS traffic management (UTM) system. The UAS may receive a mission planning response message from the UTM that includes a mission route for the UAS to navigate and a configuration of one or more trigger events. The mission route may be made up of a sequence of waypoints in an airspace. Each of the waypoints may be configured with a dynamic path conforming profile (PCP) a dynamic required navigation performance (RNP) value. The (Continued)

UAS may monitor at least the RNP value in one or more time intervals to determine if a trigger event occurs. The UAS may transmit a path conformance status report to the UTM upon determining that a trigger event of the one or more trigger events occurred. The path conformance status report may indicate conformance to one or more parameters specified in the PCP.

20 Claims, 17 Drawing Sheets

(51) Int. Cl.
    *B64U 30/20* (2023.01)
    *B64U 101/00* (2023.01)
    *G01C 21/12* (2006.01)
    *H01Q 1/28* (2006.01)

(52) U.S. Cl.
    CPC .......... *G08G 5/0026* (2013.01); *G08G 5/003* (2013.01); *G08G 5/0034* (2013.01); *G08G 5/006* (2013.01); *G08G 5/0069* (2013.01); *G08G 5/0082* (2013.01); *H01Q 1/28* (2013.01); *B64U 30/20* (2023.01); *B64U 2101/00* (2023.01)

(56) References Cited

U.S. PATENT DOCUMENTS

| | | | |
|---|---|---|---|
| 9,747,808 | B2 | 8/2017 | Chambers et al. |
| 9,847,032 | B2* | 12/2017 | Postrel ................. G08G 5/0021 |
| 10,192,450 | B2* | 1/2019 | Adler ................... G08G 5/0039 |
| 2011/0301842 | A1 | 12/2011 | Knupansky et al. |
| 2016/0275801 | A1* | 9/2016 | Kopardekar ......... G08G 5/0082 |
| 2016/0284221 | A1 | 9/2016 | Hinkle et al. |
| 2017/0236429 | A1* | 8/2017 | Stark .................... G08G 5/0039 701/14 |
| 2018/0053426 | A1 | 2/2018 | Butler et al. |
| 2018/0086483 | A1 | 3/2018 | Priest et al. |
| 2019/0108115 | A1* | 4/2019 | Gonen ................. G06F 11/3452 |

FOREIGN PATENT DOCUMENTS

| | | |
|---|---|---|
| EP | 3 139 542 | 3/2017 |
| EP | 3139542 A1 * | 3/2017 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHZ License Exempt Operation, IEEE 802.11ah-2016 (Dec. 7, 2016).

Jiang et al., "Unmanned Aircraft System traffic management: Concept of operation and system architecture," International Journal of Transportation Science and Technology 5, pp. 123-135 (2016).

Klyne et al., "Date and Time on the Internet: Timestamps," Network Working Group, RFC 3339 (Jul. 2002).

Kopardekar et al., "Unmanned Aircraft System Traffic Management (UTM) Concept of Operations," 16th AIAA Aviation Technology, Integration, and Operations Conference, AIAA 2016-3292, pp. 1-16 (Jun. 13-17, 2016).

Martin, "NASA Advances Drone Traffic Management System," (Jun. 8, 2017) available at https://www.mediapost.com/publications/article/302472/nasa-advances-drone-traffic-management-system.html.

Ren et al., "Small unmanned aircraft system (sUAS) categorization framework for low altitude traffic services," 2017 IEEE/AIAA 36th Digital Avionics Systems Conference (DASC), pp. 1-10 (Sep. 2017).

Wikipedia, "Fundamental diagram of traffic flow" (Aug. 24, 2017) available at https://en.wikipedia.org/w/index.php?title=Fundamental_diagram_of_traffic_flow&oldid=796969691.

NASA, "UTM Unmanned Aircraft Systems Traffic Management MultiUTM ConOps," (Jun. 13, 2016).

\* cited by examiner

UTM Technical Capability Levels (TCLs)

Capability 1: Demonstrated How to Enable Multiple Operations Under Constraints

- Notification of Area of Operation
- Over Unpopulated Land or Water
- Minimal General Aviation Traffic in Area
- Contingencies Handled by UAS Pilot Product: Overall Con Ops, Architecture, and Roles

Capability 2: Demonstrated How to Enable Expanded Multiple Operations

- Beyond Visual Line-of-sight
- Tracking and Low Density Operations
- Sparsely Populated Areas
- Procedures and "Rules-of-the-Road"
- Longer Range Applications Product: Requirements for Multiple BVLOS Operations Including Off-nominal Dynamic Changes

Capability 3: Focuses on How to Enable Multiple Heterogeneous Operations

- Beyond Visual Line of Sight/expanded
- Over Moderately Populated Land
- Some Interaction with Manned Aircraft
- Tracking, V2V, V2UTM and Internet Connected Product: Requirements for Heterogeneous Operations

Capability 4: Focuses on Enabling Multiple Heterogeneous High Density Urban Operations

- Beyond Visual Line of Sight
- Urban Environments, Higher Density
- Autonomous V2V, Internet Connected
- Large-scale Contingencies Mitigation
- Urban Use Cases Product: Requirements to Manage Contingencies in High Density, Heterogeneous, and Constrained Operations Risk-based Approach: Depends on Application and Geography

FIG. 3

| State Name | Abbreviation | State Type | Description | Technical Capability Level |
|---|---|---|---|---|
| Proposing | P | Transition | The Operation Plan has been Submitted to the UTM System, but no Decisions have been Made Regarding it. It is not Expected that an Operational Plan Spends Significant Time in this State. Decisions will be Automated and Decided as Quickly as the System is Able. This Time may vary Based on the Load on the System or the Complexity of the Decision being Made, but it Should happen "Quickly" (on the Order of Seconds would be a Long Time). | 1 |
| Accepted | A | Temporary | The Operation Plan was Accepted as Valid and All Other Planning in the System takes into Account the Future Existence of this Operation. | 1 |
| Rejected | R | Final | The Operation Plan was Rejected for Some Reason. There can be no Further Changes to this Particular Operation. The Operator's only Recourse is to Submit a New Plan, Hopefully Taking into Consideration the Constraint(s) that Caused the Initial Rejection. | 1 |
| Readied | I | Transition/ Temporary | The Operator of an Accepted Operation Plan has Indicated to the UTM System that the Operator is Ready to Commence its Mission. The UTM System has Responded with a Clearance for that Operation to Commence. For TCL 1, this State is Likely Transitory, and the Plan would Automatically Move to Activated. In Future Scenarios, the Operation may be Readied but not Activated as it Waits for Some Other Stimulus (Slot in an Overhead Stream, for Example). | 1+ |
| Activated | V | Temporary | The Operation is Currently Active. This does not Necessarily Imply the Operation is Currently Airborne. The Operation may be Activated, but Still Preparing for Departure, or it may be Activated and on the Ground for a Battery Swap, etc. | 1 |
| Closed | C | Final | The Operation was Accepted, Activated, then Successfully Completed its Mission. | 1 |
| Expired | E | Final | The Operation was never Cancelled and never Activated after its Planned Start Time. | 1 |
| Cancelled | X | Final | The Operation Plan was Cancelled either by Operator or the UTM System After being Accepted. | 1 |

FIG. 6A

| | | | | |
|---|---|---|---|---|
| Non-Conforming | F | Temporary | An Active Operation Plan is Currently not Conforming to its Plan or to UTM Procedures. Examples of Non-compliance: Leaving Geofenced Area, Entering Unauthorized Area, Flying Faster than Expected/Planned, Flying Beyond Planned End Time, etc. | 1 |
| Rogue | U | Final | A Non-conforming Operation that does not Communicate with the UTM System nor Tries to Correct the Non-compliant Behavior will be Labeled as Rogue. A Rogue Operation has only One Standing Directive from the UTM System: Land. An Operation cannot Leave the Rogue State by Correcting any Behavior. | 1 |
| Modifying | M | Transition | The Operation was Accepted (not yet Activated) and the Operator is Currently Requesting a Change to the Plan. | 2+ |
| Requesting | Q | Transition | The Operation was Activated and the Operator is Currently Requesting a Change to the Plan. | 2+ |
| Aborting | G | Temporary | An Operation is no Longer Using its Original Plan and is in the Process of Ending its Operation. | 2+ |
| Aborted | B | Final | The Operation was Activated and was Ordered to Ground or Home Before Completion. This could be Due to Directives from the UTM System or Actions by the Operator (Mechanical or Comm Problem, for Example). | 2+ |
| Intruder | Z | Final? | Any Flight Operation that is not Part of the UTM System. These Could Include UAS without any Plan in the System, Hang Gliders, General Aviation Aircraft, etc. | 2+ |

Ⓐ

FIG. 6B

PROTOCOL DESIGN FOR UNMANNED AERIAL SYSTEM (UAS) TRAFFIC MANAGEMENT (UTM)

CROSS REFERENCE TO RELATED APPLICATIONS

This application is the U.S. National Stage, under 35 U.S.C. § 371, of International Application No. PCT/US2018/056066 filed Oct. 16, 2018, which claims the benefit of U.S. Provisional Application No. 62/572,939 filed on Oct. 16, 2017, the contents of which are hereby incorporated by reference herein.

BACKGROUND

Several applications for small Unmanned Aerial Systems (sUAS) have been envisioned including package delivery, precision agriculture, and pipeline inspection. sUAS operations are expected to occur in the same airspace as the current manned airspace systems, but at altitudes less than 400 feet.

SUMMARY

Methods, systems, and apparatuses for use in unmanned aerial systems (UASs) are disclosed. A UAS may execute a mission planned by a UAS traffic management (UTM) system. The UAS may receive a mission planning response message from the UTM. The mission planning response message may include a mission route for the UAS to navigate and one or more trigger events. The mission route may be made up of a sequence of waypoints in an airspace. Each of the waypoints may be configured with a dynamic path conforming profile (PCP) and a dynamic required navigation performance (RNP) value. The UAS may monitor at least the RNP value in one or more time intervals to determine if a trigger event occurs. The UAS may transmit a path conformance status report to the UTM upon determining that a trigger event of the one or more trigger events occurred. The path conformance status report may indicate conformance to one or more parameters specified in the PCP.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 3 is an illustration of UTM Technical Capability Levels (TCLs);

FIG. 6A and FIG. 6B are a table providing descriptions of a UAS operational states;

DETAILED DESCRIPTION

Figure 1A:
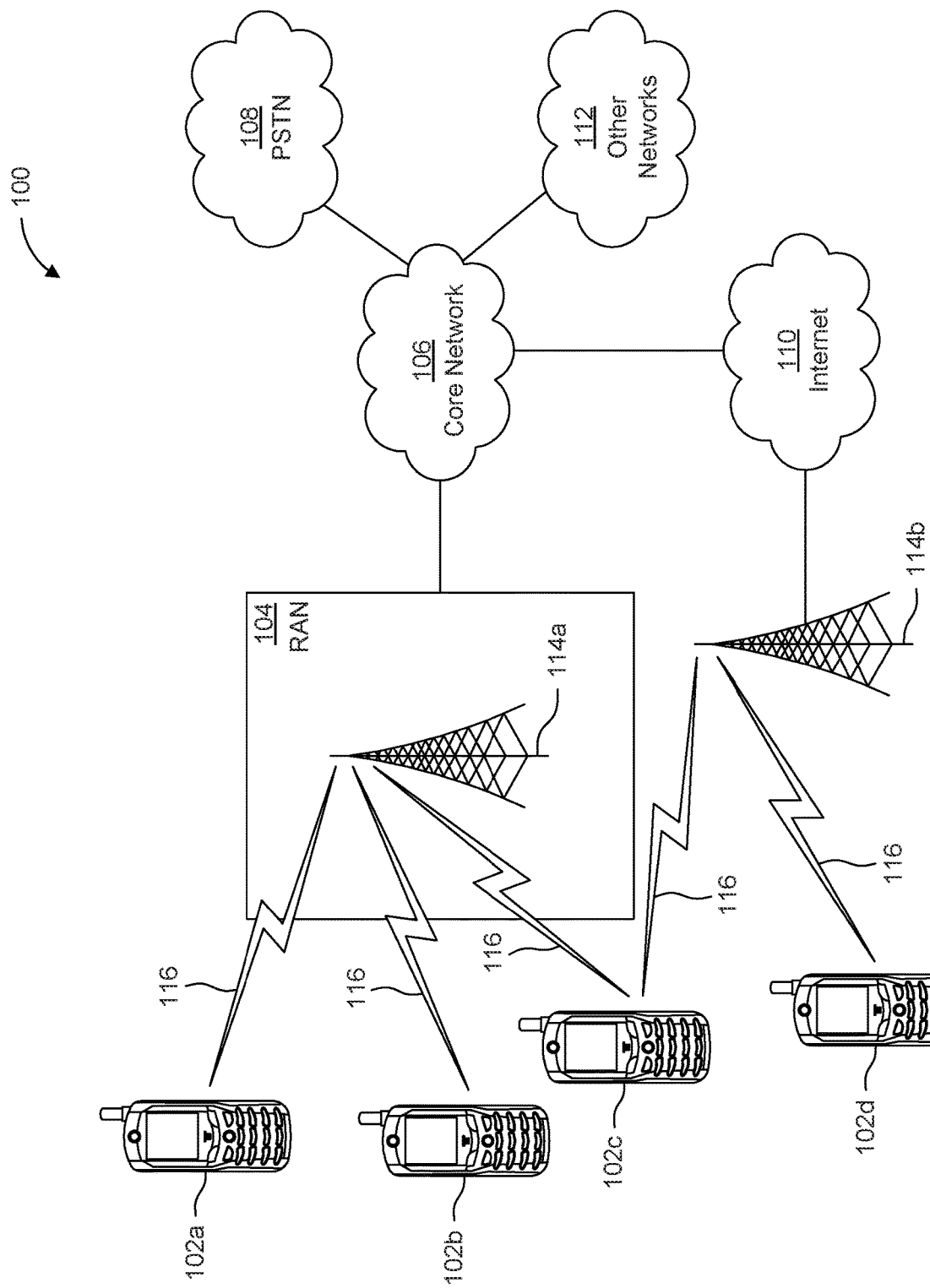
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
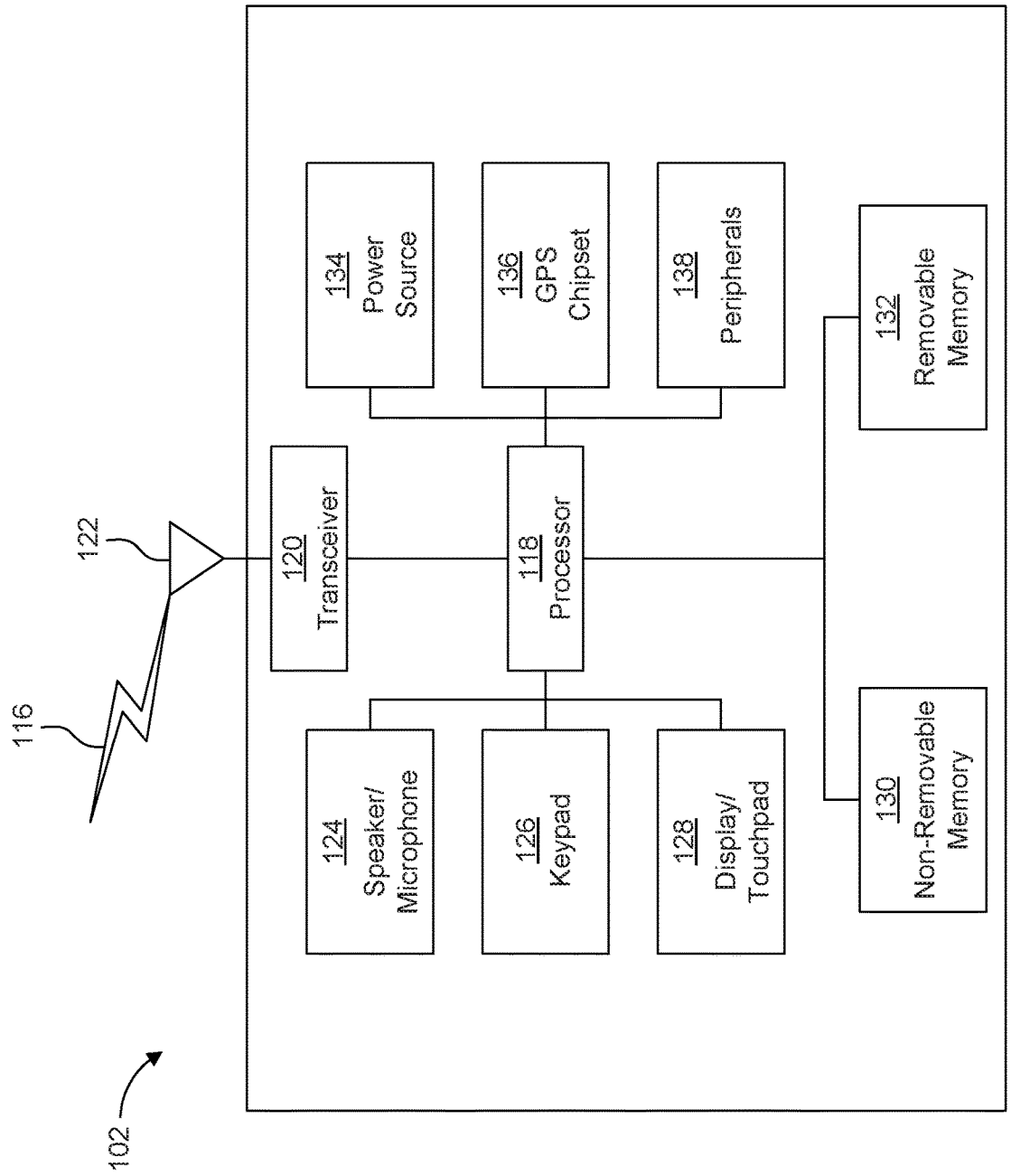
FIG. 1B is a system diagram illustrating an example wireless transmit/receive unit (WTRU) that may be used within the communications system illustrated in FIG. 1A according to an embodiment.
Figure 1C:
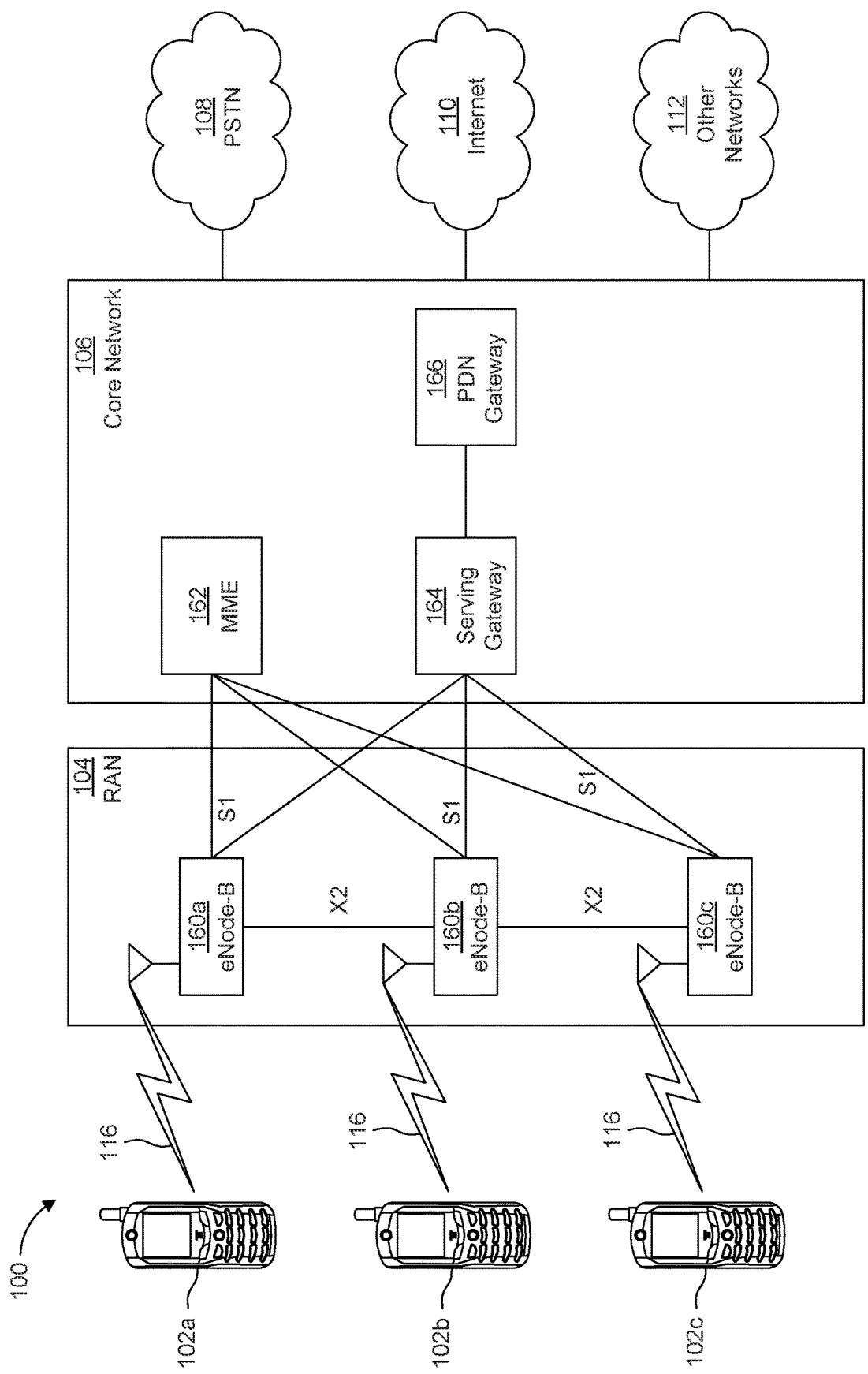
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 10:
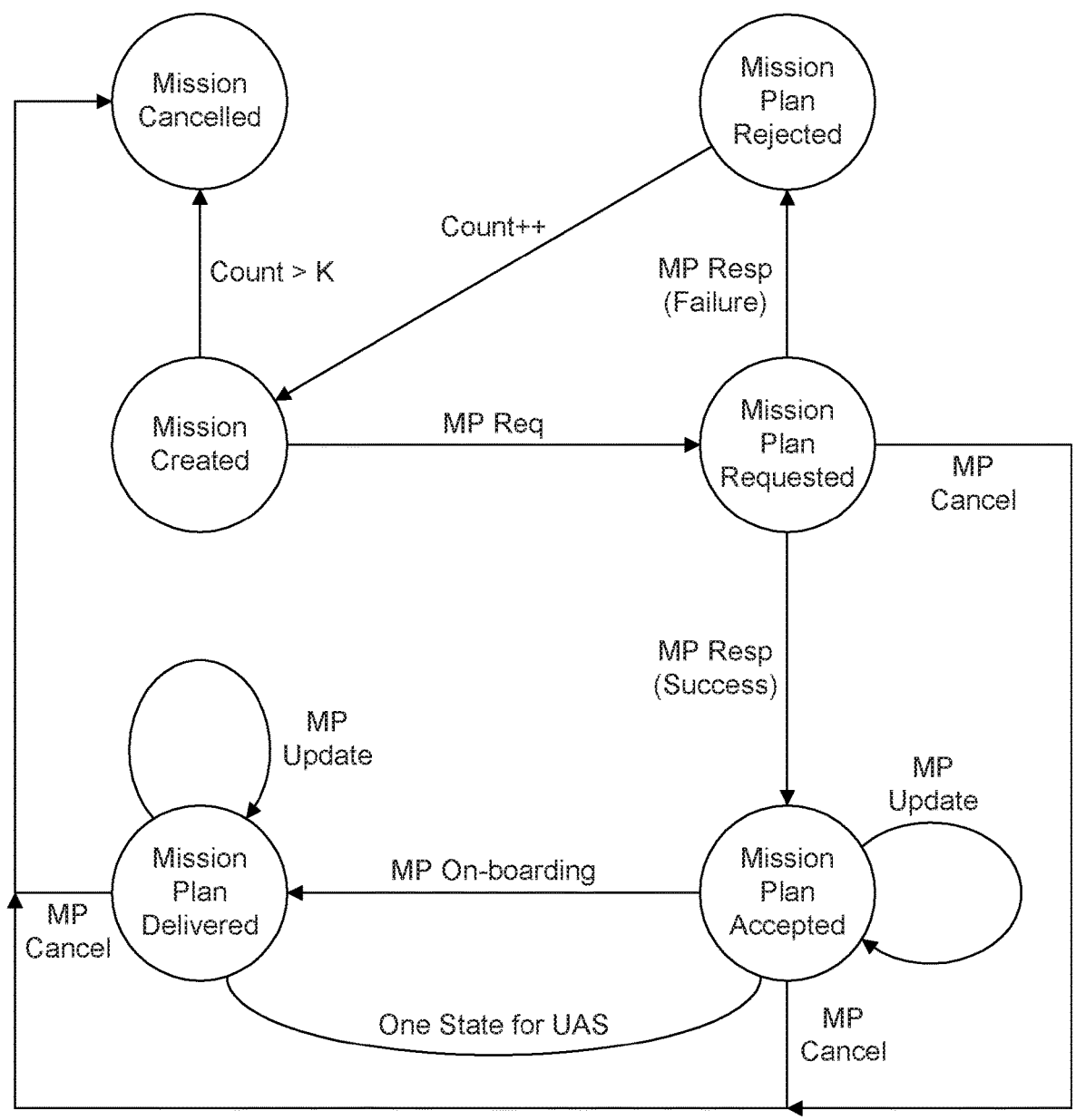
FIG. 10 is an illustration of a mission planning state machine of a UAS or UAS operator.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
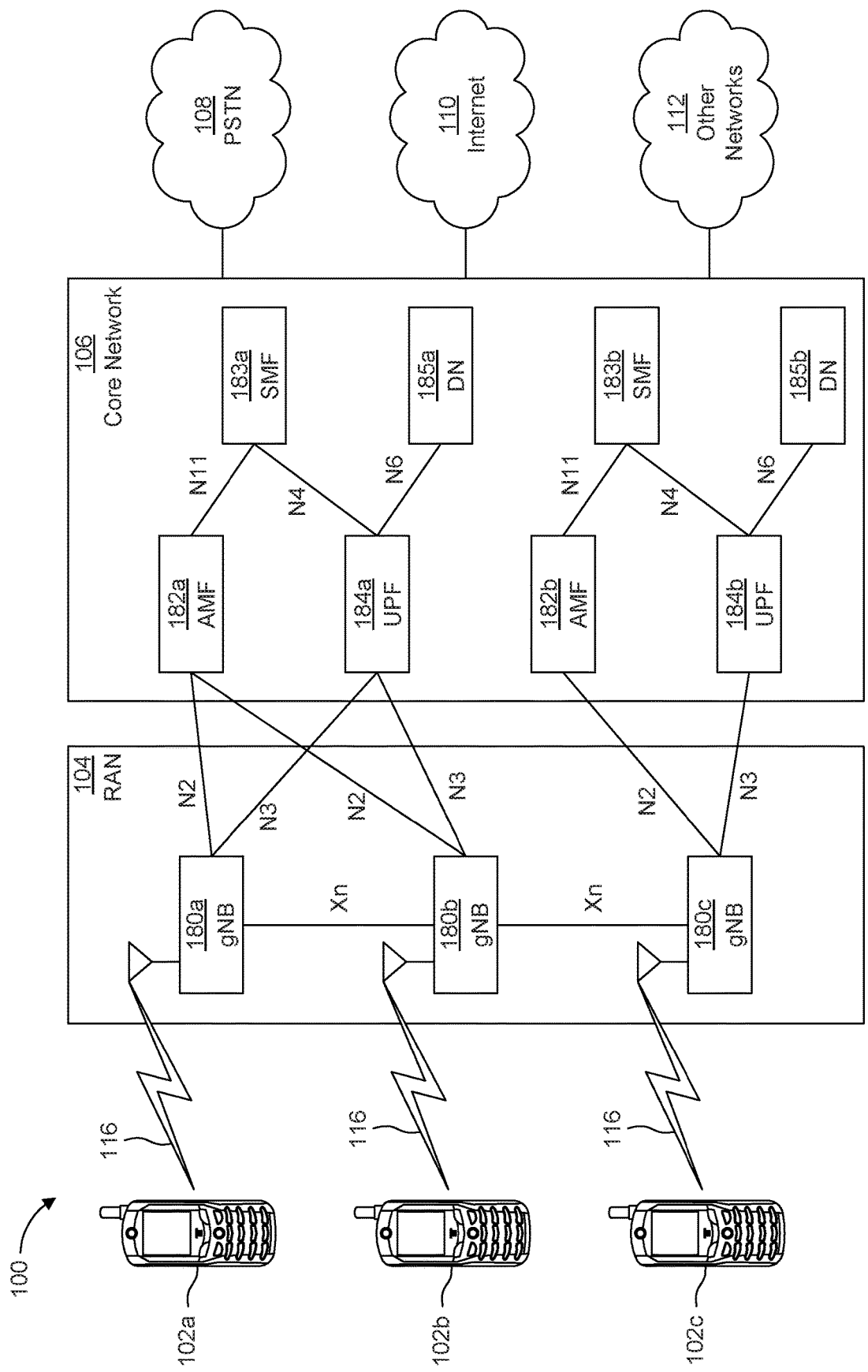
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

One of the challenges in integrating small Unmanned Aerial Systems (sUAS) in a national airspace is not only to ensure safety of sUAS operations, but also not to jeopardize the current manned operations. Further, sUAS operations for some applications may operate fully autonomously in beyond visual line of sight (BVLOS) scenarios. Natural concerns for reliable operations in BVLOS scenarios are the ability of sUAS to respond to dynamically changing environment, traffic scenarios, contingency management, and reliable data link connection between the ground control station and sUAS. IT may be possible to apply techniques used in manned air traffic management (ATM) system to sUAS, the density of the envisioned sUAS operations, which may be much higher than current manned systems, may make it difficult to do so.

For example, automatic dependent surveillance-broadcast (ADS-B) systems used in manned systems may not scale. Flight planning and air space resource reservation for manned systems may be semi-static for the duration of flight and may lead to inefficient airspace management for small UAS systems.

Figure 2:
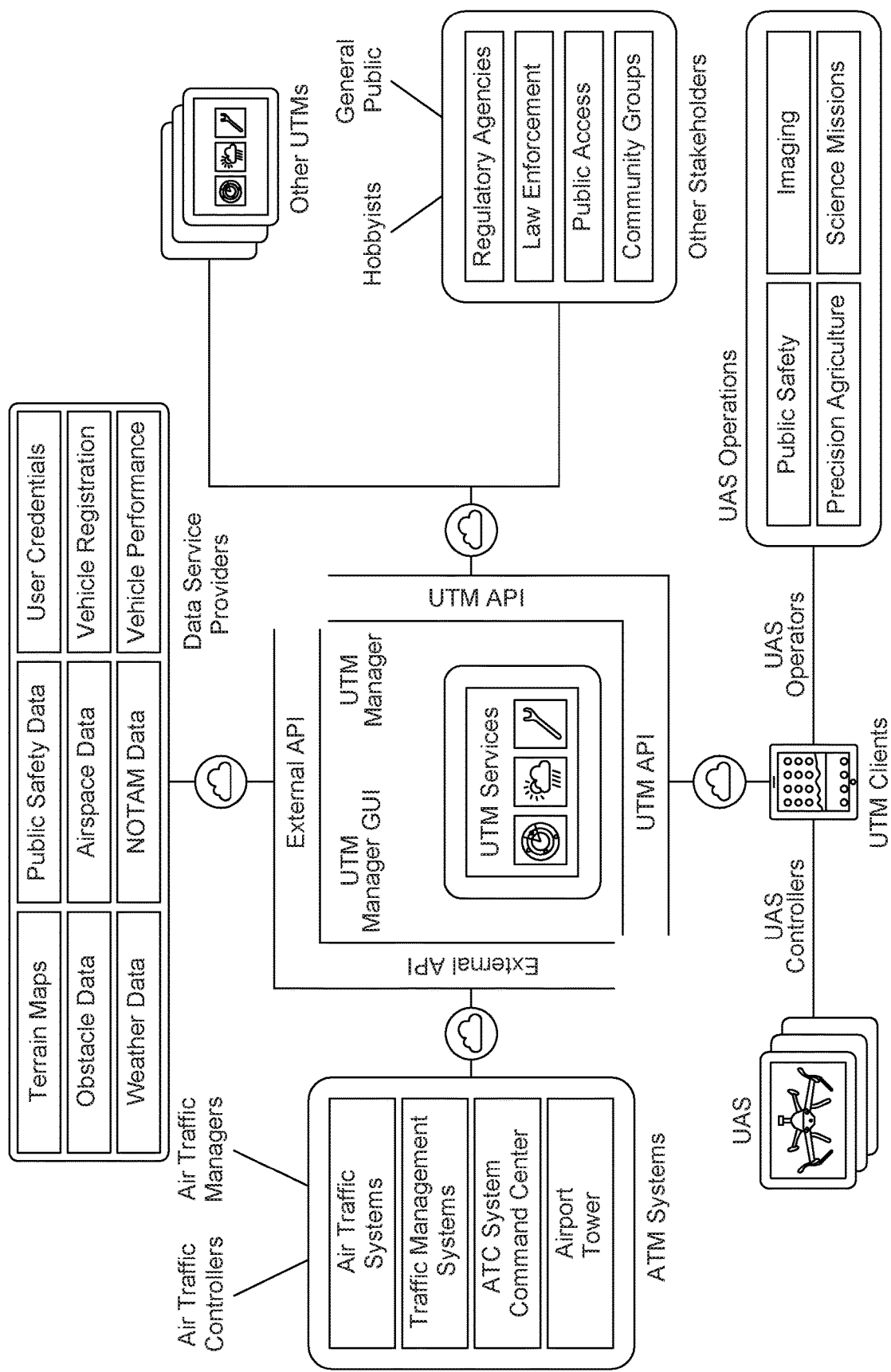
FIG. 2 is a diagram of an exemplary architecture of an Unmanned Arial System (UAS) Traffic Management (UTM)

Referring now to FIG. 2, diagram illustrating an exemplary UAS traffic management (UTM) architecture is shown. UASs may impose risks of collisions to existing manned aircraft system, between each other and to people and objects on the ground. Without a centralized traffic management system like an ATM system, UASs may not be able to fly beyond line of sight at a high density. Conventional or evolved ATM system may not be able to take on the responsibility to manage the UASs. UASs may need to be managed by a separated traffic management system that is not a part of ATM system. Therefore, a UTM system may be required for future UAS operations, especially beyond line of sight.

The UTM architecture shown in FIG. 2 may enable efficient integration of sUAS in national airspaces. The UTM system may include the following functions: Interface to ATM, Shared Database, UTM Service Supplier and UTM clients. The Interface to ATM function may allow the UTM to exchange aircraft traffic flow information with the ATM system, especially at potential overlapped airspaces, such airports. The Shared Database function may allow the UTM system to share the same database used by ATM system with airspace management related data, such as air navigation service provider (ANSP) databases. Since UASs fly at low altitudes, the weather and terrain maps may be used during the whole operation instead of just at airport areas for the ATM system. The UTM Service Supplier (USS) function may be a business and technical entity that manages airspaces for UAS operations and provides interfaces to ATM and ANSP. For any given geographical airspace, one or more USSs may share the management responsibility for different UAS operations. The UTM Clients function may be UAS operators or UASs that access the UTM services via a USS.

Referring now to FIG. 3, a diagram illustrating UTM technical capability levels (TCLs) is shown. There may be four TCLs for sUAS. TCL2 is the next step of sUAS operation, the main addition is the BVLOS capability and longer range applications. At TCL3 and TCL4, high density UAS operations are expected, which may require V2V and V2UTM communications to assist the overall system decisions for safe operation with high airspace utilization. At TCL4, the UTM may support the full integration of UAS to the national airspace (NAS).

Figure 4:
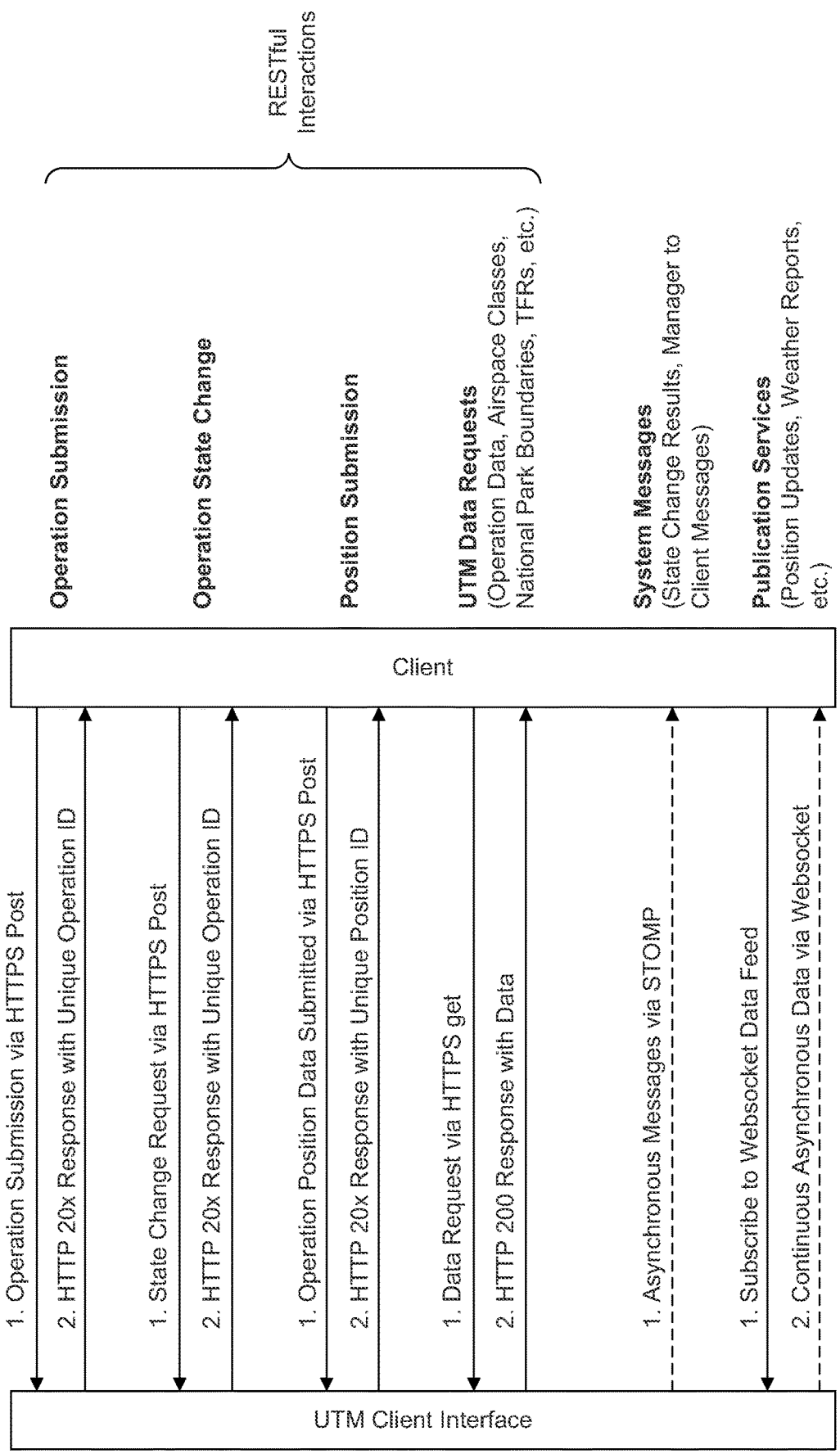
FIG. 4 is a message diagram of a UTM client interface.

Referring now to FIG. 4, a diagram illustrating a UAS operation is shown. A UAS Operation Protocol and API for use by developers are described herein. A function of the UTM will be to provide resource mitigation, contingency management, and system information to operators of UAS operations. To accomplish these UTM functions, operators may provide their planned operations to the UTM system. This operation information submission process is one of the client-facing functions of the UTM system. These submissions may be considered "requests" or "reservations" for access to the airspace.

In conjunction with the submission of operation information, the UTM may provide clients with an initial decision on the status of their submission as soon as it can do so. This may happen synchronously with the flight submission, but it may also be an asynchronous process to provide flexibility to the system in terms of current load, decision-making difficulty, and other potentially uncontrollable factors such as network reliability.

There may be situations where the initial approval decision needs to be updated. In this case, the UTM system may provide a notification to the appropriate operators of the update. Such updates would likely be due to updated information about the airspace (new weather information, equipment outages, uncooperative vehicle intrusion, etc.). These updates may be referred to as operation decision status updates.

Clients may be able to submit state information regarding their flights. This may be a data point representing where the flight is at a given time, perhaps together with other state information like heading, attitude, speed, and other data. The client may provide this data in a manner like the submission of the flight plan. The UAS operators may provide surveillance of their own aircraft and may communicate the appropriate state data via an Internet connection. The role of surveillance may be different and may involve an additional entity or collaboration between operators and UTM maintainers.

Given that UTM may have access to all operational plans in the system, UTM may provide information related to those plans to other users in the system. This data may be appropriately delayed, obfuscated, redacted, etc. as the operating concept for UTM dictates. In general, the goal of this function to clients is to provide as complete of a picture as possible regarding the flights in the system. This is in support of common situational awareness for all stakeholders involved in UTM.

The UTM may also provide publication services of data relevant to the system. This concept may support a standard publish-subscribe model for data delivery. Clients may subscribe to specific or general data feeds that may continually supply updates about the system. These updates may include new flight plans that have been submitted or decided upon, constraints in the system, general information, etc.

FIG. 4 illustrates an exemplary UTM client interface. In FIG. 4, an abstract interface is defined between the UTM server and UTM client. Both UTM server and UTM client may include multiple entities in the system. On the server side, the entities may be UAS operator, USS or core UTM services. On the client side, the entities may be either the user computer (pilot GUI) or the UAS on board unit (auto pilot). Depending on what function of the operation, the operation protocol may be defined between one server function and one client function.

Besides the protocols between a UTM server function and a UTM client function, a UAS operation may also involve data exchanges between UTM functions at the server. For example, an operation plan may be submitted from a UAS operator platform to USS platform and to a core UTM service that coordinate the airspace. A UAS on board unit may be manually controlled by a UAS user via a pilot GUI.

A UAS Operation State Machine may be provided for tracking and maintaining state. At any instant, a UTM system client, either a UAS or a UAS operator, may be in exactly one of several possible states. These states may be tracked by the UTM system and are not directly modifiable by the client system. These states may update based on information received by the client based on the state of other data in the system, rules and regulations, as well as other factors.

Figure 5:
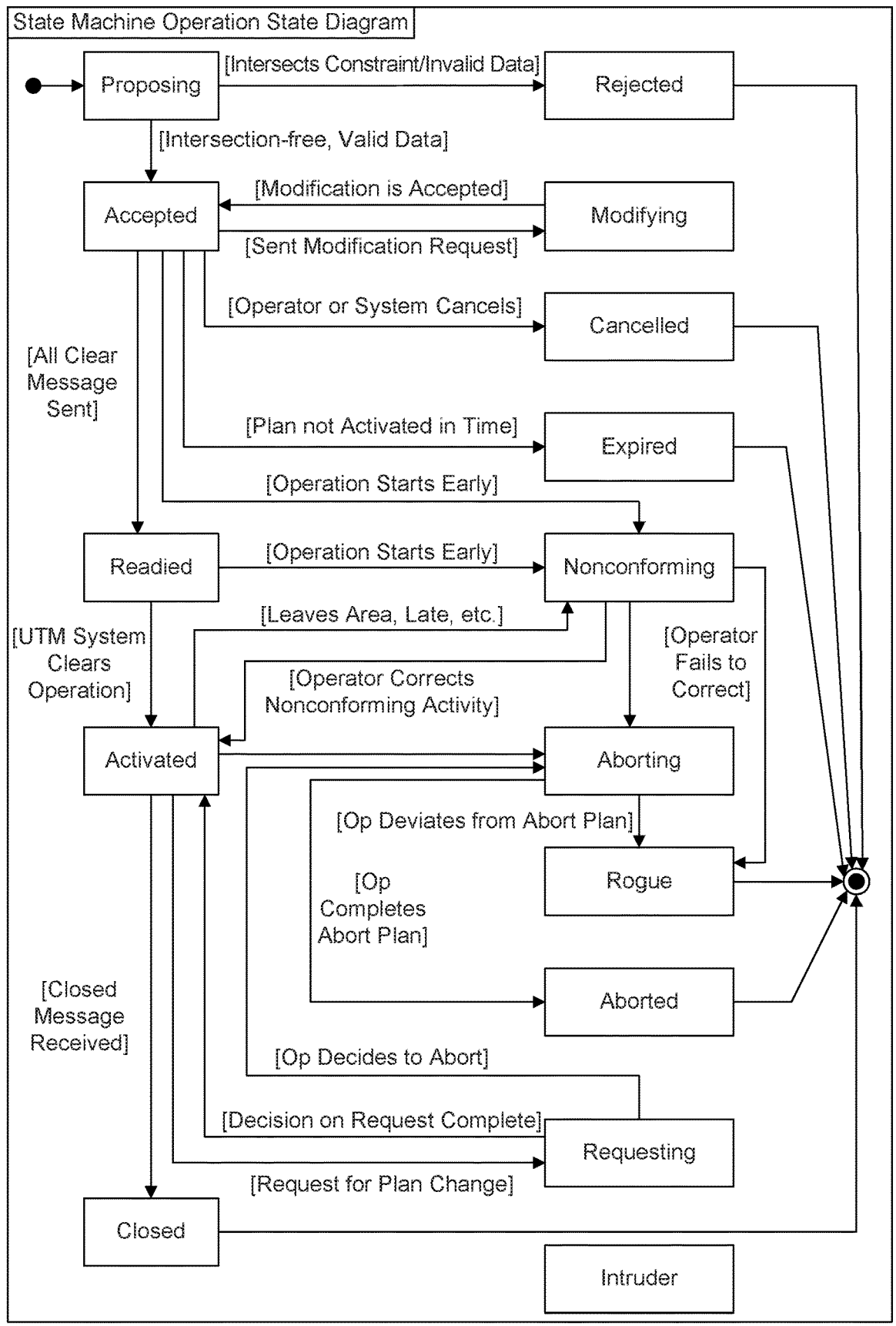
FIG. 5 is an operational state diagram for a UAS.

Referring now to FIG. 5, a diagram illustrating a UAS operation state is shown. FIGS. 6A-6B describe the meaning of each state in details. As an example, when the client submits an initial plan, that plan may be in the "proposing" state and may subsequently move into either the "accepted" or "rejected" states. A note on the naming convention of the states is warranted. Any state with the suffix "-ing" implies that the operational plan is being actively processed by the UTM system and is termed a "transition" state. All other states end in "-ed" and are either "temporary" states or "final" states. Temporary states may transition to another state at some point in the future while final states may not move to another state.

Figure 7:
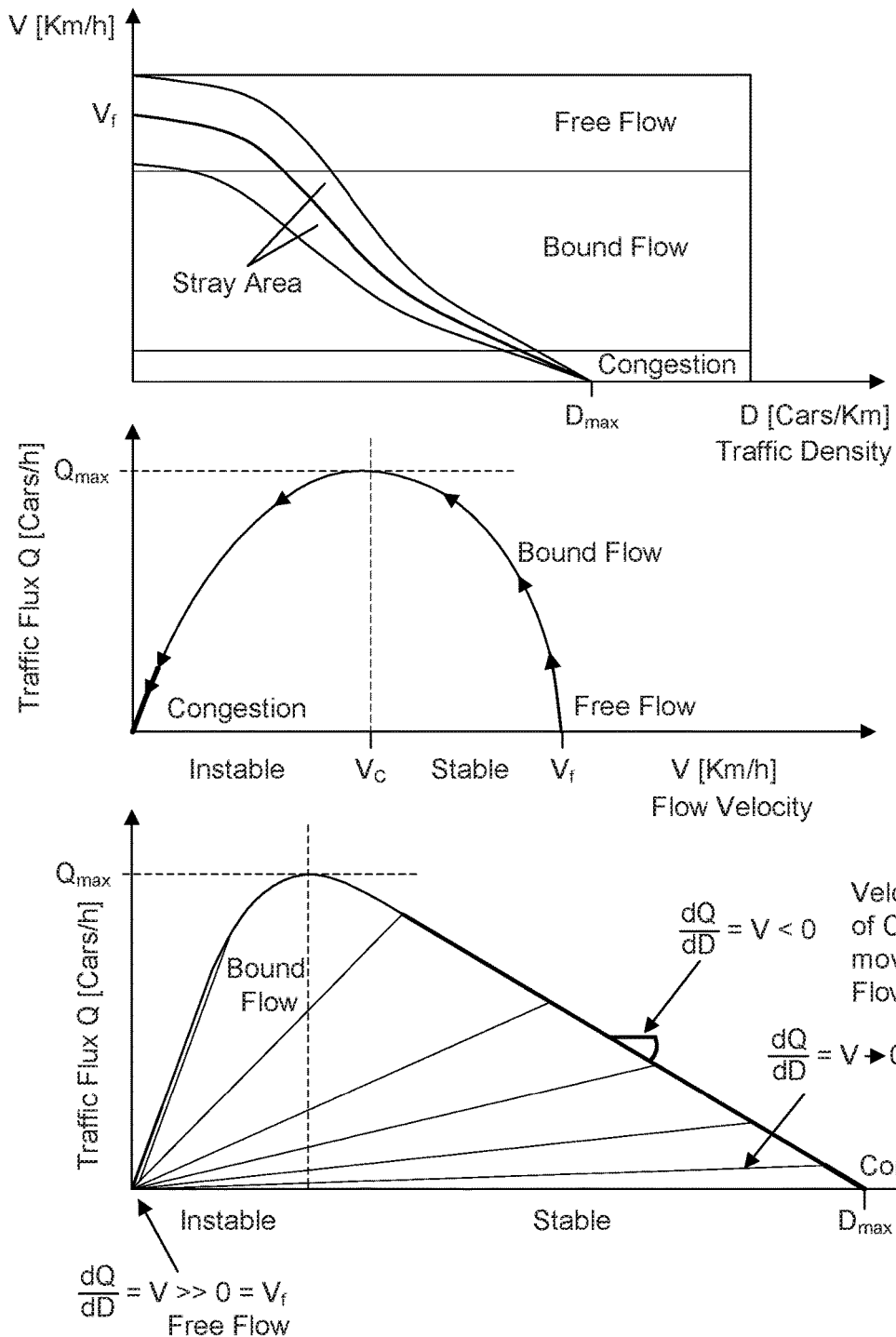
FIG. 7 is a fundamental diagram of traffic flow.

Referring now to FIG. 7, a diagram illustrating a highway traffic model is shown. There may be a similarity between the traffic management of automobiles and drones. The capacity of a road is not simply the number of automobiles it may accommodate. The capacity depends on the speed of the automobiles on the road. The higher the speed, the larger the headway is needed, therefore, the less number of automobiles on the road at a given time. In the first figure, the traffic density (capacity) determines the traffic flow velocity, or vice versa. In the second figure, there is an optimal velocity that gives the highest throughput (number of automobiles per unit time). The density may be used at the highest throughput, for the capacity of a road. The highway traffic model may apply to air traffic, a capacity of a path in the airspace should be considered as the density at either the optimal flow velocity or the maximum flow velocity, whichever is smaller.

Figure 8:
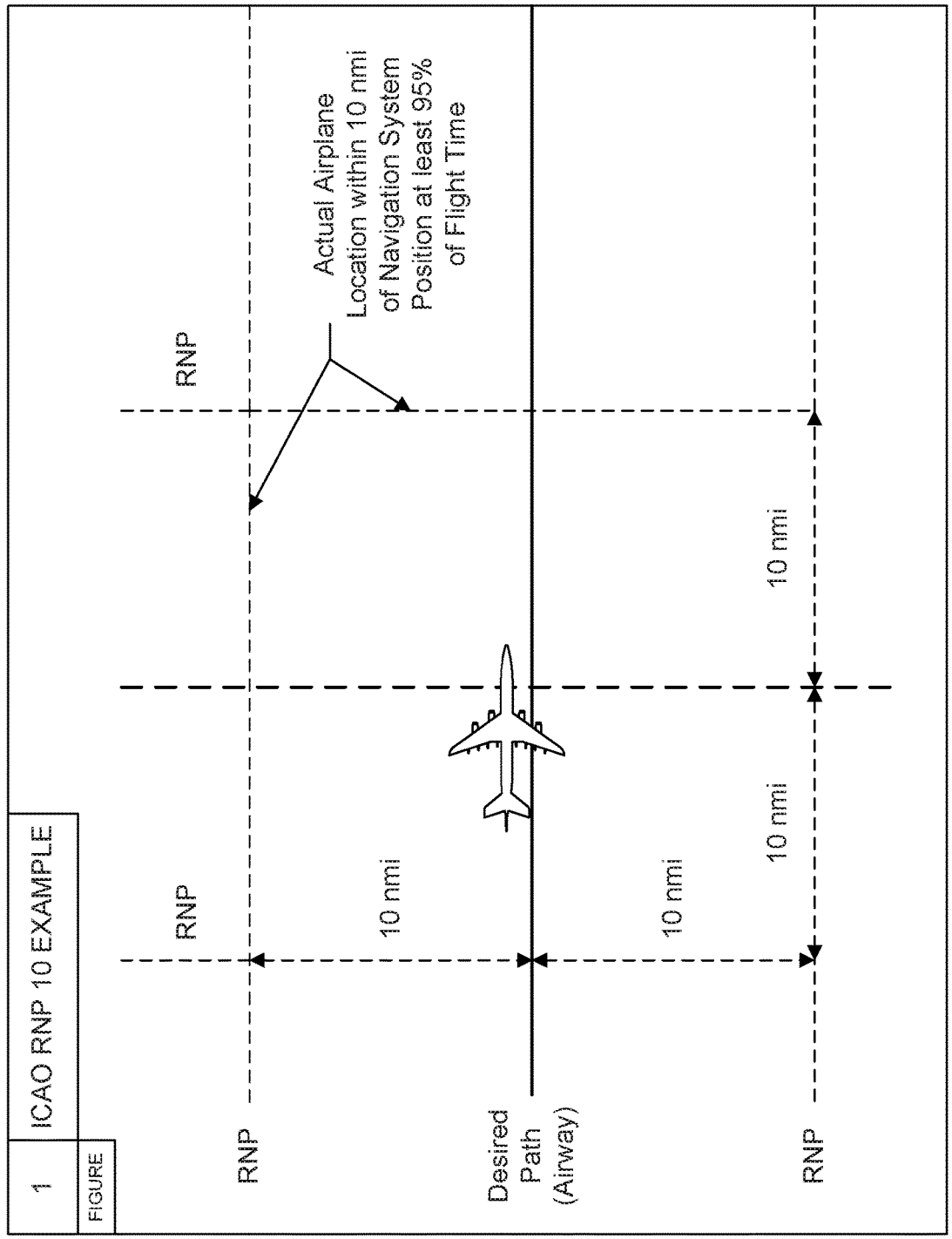
FIG. 8 is an exemplary Required Navigation Performance (RNP) definition.

Referring now to FIG. 8, a diagram illustrating Required Navigation Performance (RNP) is shown. RNP is a navigation method for manned aircraft that uses the aircraft's flight management system and satellite positioning to fly a precise 3D path in the sky. A RNP x means that an aircraft may calculate its position, using its on-board sensors, within a square with a lateral dimension of x nautical miles (NMs). An aircraft equipped with an RNP system with capability value of x (RNP x) indicates it may maintain on its airway within the square of x nautical miles for at least 95% of flight time. An RNP 10 is illustrated in FIG. 8. In other words, an RNP x capable aircraft may report its position with an error less than x NMs at a 95% confidence level.

FIG. 8 illustrates an exemplary RNP Definition. The RNP defined for a manned aircraft depends on one or more of the navigation system error (NSE), flight technical error (FTE), and path definition error (PDE). The RNP value is at the scale of miles and it is a deterministic value not affected by external factors. Comparing with the size of the aircraft, the GNSS accuracy is good enough to determine the position. Therefore, the RNP capability for a manned aircraft may be referred via a VIN, the variance may be relatively small within the same class of aircrafts.

A similar RNP method may be used for UTM to indicate the capability of reporting and navigation of a UAS. In the UTM architecture shown in FIG. 2, a UAS may be accessing a USS via a ground station operated by the UAS operator. In TCL1, when UAS is operated in visual line of sight (VLOS), a UAS operator and/or pilot may be required to operate the UAS via a direct wireless link. However, in TCL2 and above, when UAS is operated BVLOS, a UAS operator may be optional for UAS operation. A UAS operator may provide offline services, such as fleet management, UTM system registration and USS subscription. The UAS operator may also request mission planning service from the USS before the operation and then choose a UAS to execute the mission. In this case, a UAS who receives the mission plan from its UAS operator may execute the mission later. In the mission execution, the UAS may be directly managed by the USS or indirectly via its UAS operator.

For TCL2 and above, a UAS operator may have an account with the UTM system (USS) and operate a fleet of UAS as an enterprise or an aggregator. Alternatively, a UAS may directly get UTM services from USS without a UAS operator. If a UAS has a UAS operator, offline services may go through the UAS operator. In other words, a UAS may be self-operated like a mobile phone that may directly register, subscribe and connect to mobile service providers.

Figure 9:
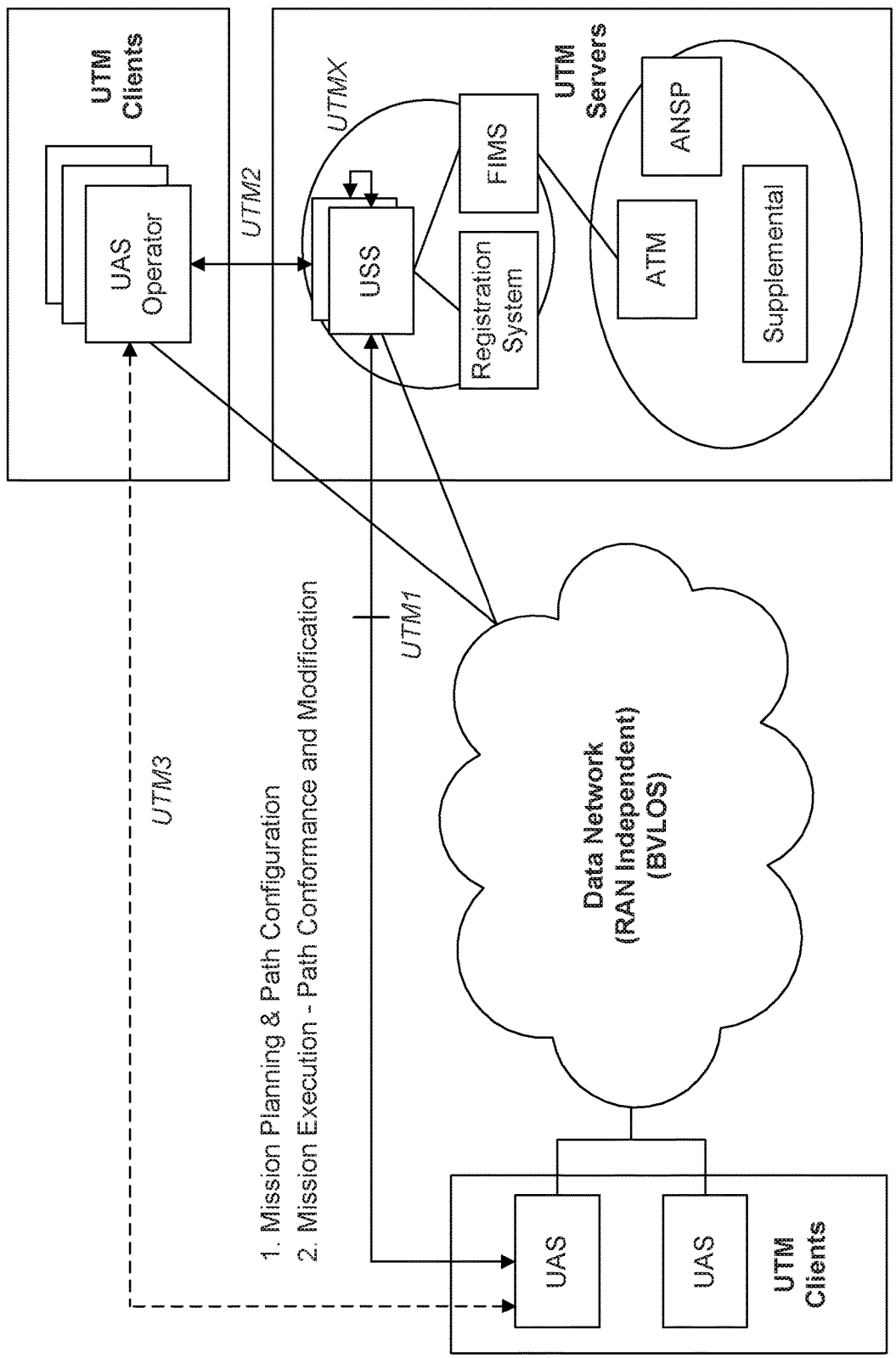
FIG. 9 is an illustration of UTM protocol interfaces.

Referring now to FIG. 9, a diagram illustrating UTM interfaces is shown. A UTM1 may be interface between a UAS and the USS (UTM service supplier) it subscribes to. This is an interface that should be focused on. A UAS may subscribe to a USS and maintain a session with it to run protocols for both mission planning and mission execution services. UTM2 may be interface between a UAS operator and a USS. The UAS operator may subscribe to a USS and run a mission plan protocol for a UAS operation. It may also run as a proxy for a UAS operation and relay mission execution protocol messages to the UAS. UTM3 may be an interface between a UAS and its UAS operator. This interface is likely a proprietary interface specified by the UAS operator. The UAS may access the UTM services completely via its UAS operator, or UAS may run mission execution protocol directly over UTM1 interface and leave other services on UTM3 interface. In case the mission planning request is made by a UAS operator, the result of plan must be forwarded to the UAS for mission execution. UTMX may be interface between two USSs. In case two USSs are managing the same geographical airspace, coordination is needed to avoid conflict of airspace traffic flow allocations.

Two operation phases may be specified over the UTM interfaces shown in FIG. 9. They include a mission planning phase and mission execution phase. A sample state machine of the UTM client duration is provided with respect to UAS operation. The UTM client state machines in mission planning and mission execution are disclosed separately herein, and exemplary message exchanges between UTM clients (UAS or UAS operator) and USS are given.

Referring now to FIG. 10, a diagram illustrating states of a UAS during mission planning is shown. The state of a UAS starts as MissionCreated when a UAS operation task is created by a UAS application on UAS. Then UAS may send a Mission_Planning_Request and enters to MissionPlanRequested. If a Mission_Planning_Response is received with a failure status, the UAS may go to a MissionPlanRejected state. After a timer, the UAS may increase the retry count and may go to MissionCreated state again. A mission planning effort may be tried K times specified by the UTM system. For different tries, the UAS may request to different USSs to increase the chance of success. If K times are attempted, the UAS may go to MissionCancelled state.

If the UAS receives a Mission_Planning_Response from the USS with a success, it may go to MissionPlanAccepted state. In the Response, the UAS may receive a partial or full mission route. At this state, the UAS may receive a Mission_Planning_Update with an updated mission route. The UAS may remain at this state. The UAS then may send a Mission_Planning_Confirm to confirm the mission route and a MissionPlanDelivered state may be entered. In this state, the UAS may also receive a Mission_Planning_Update with an updated mission route and may return to MissionPlanAccepted state. After the Mission_Planning_Confirm is sent by the UAS, it may go to the MissionPlanDelivered state. In any of the good (green) states, if the UAS receives a Mission_Planning_Cancel from the USS for whatever reason, it goes to MissionCancelled state.

The state machine may also apply to a UAS operator that initiates the Mission_Planning_Request to USS. For UAS operator, there may be a mission on-boarding process and a MPDelivered state split from the MPAccepted state. For UAS, MPAccepted and MPDelivered may be considered the same state.

On a UAS, when it receives a Mission_Plan_On-boarding_Request or Mission_Planning_Response and accepts the mission, it enters to MissionOnboard state. At this state, it may receive Mission_Planning_Update with updated mission route and attributes.

Before the starting time of mission execution, the UAS may need to set up a command and control (C2) link to the USS servers UTM service over the UTM1 interface and may enter the MissionReady state. At this state, it may again receive Mission_Planning_Update from the USS with an update mission route and attributes. Over the C2-link, the UAS may receive command and control (C2) messages from USS and reports its flying status to USS.

In MissionReady state, the UAS may wait for the takeoff time specified in the mission route or for a Path_Conforming_Control message from USS to trigger its taking off. Then the UAS may send a Path_Conforming_Report with an EventType=takeoff, and may enter the MissionActived state. The UAS may remain in the same state if it conforms with the path in the mission route and may send a Path_Conforming_Report with an EventType=periodic.

The UAS may send a Path_Conforming_Report with an EventType=failure, and may enter a PathNonConform state if it fails to conform to the path in the mission route. In the PathNonConform state, the UAS may receive a Path_Conforming_Control message with an alerting flag and/or a modified mission route. It may go back to MissionActived state if it resumes the path or conform to a modified path updated by the USS, and may send a Path_Conforming_Report with an EventType=resume to USS.

In the PathNonConform state, the UAS may receive a Path_Conforming_Control message with an abort flag and a contingency plan, such as a safe landing spot. It may try to land to the safe landing spot and sends a Path_Conforming_Report with an EventType=aborting. Then the UAS enters AbortLanding state. After it lands, it enters to a MissionTerminated state. The UAS may send unsubscribe to USS service after it enters to the MissionTerminated state.

If the UAS loss connectivity to USS, it may get into a Rogue state and may follow another contingent action plan and may enter the MissionTerminated state. At the MissionActivated state, if UAS flies to the destination of the mission route, it may send a Path_Conforming_Report with an EventType=landing and may enter a CloseLanding state. After the UAS completes the landing, the UAS may send a Path_Conforming_Report with an EventType=complete and may enter the MissionTerminated state. A message to unsubscribe USS service may be sent to the USS in this state.

Figure 11:
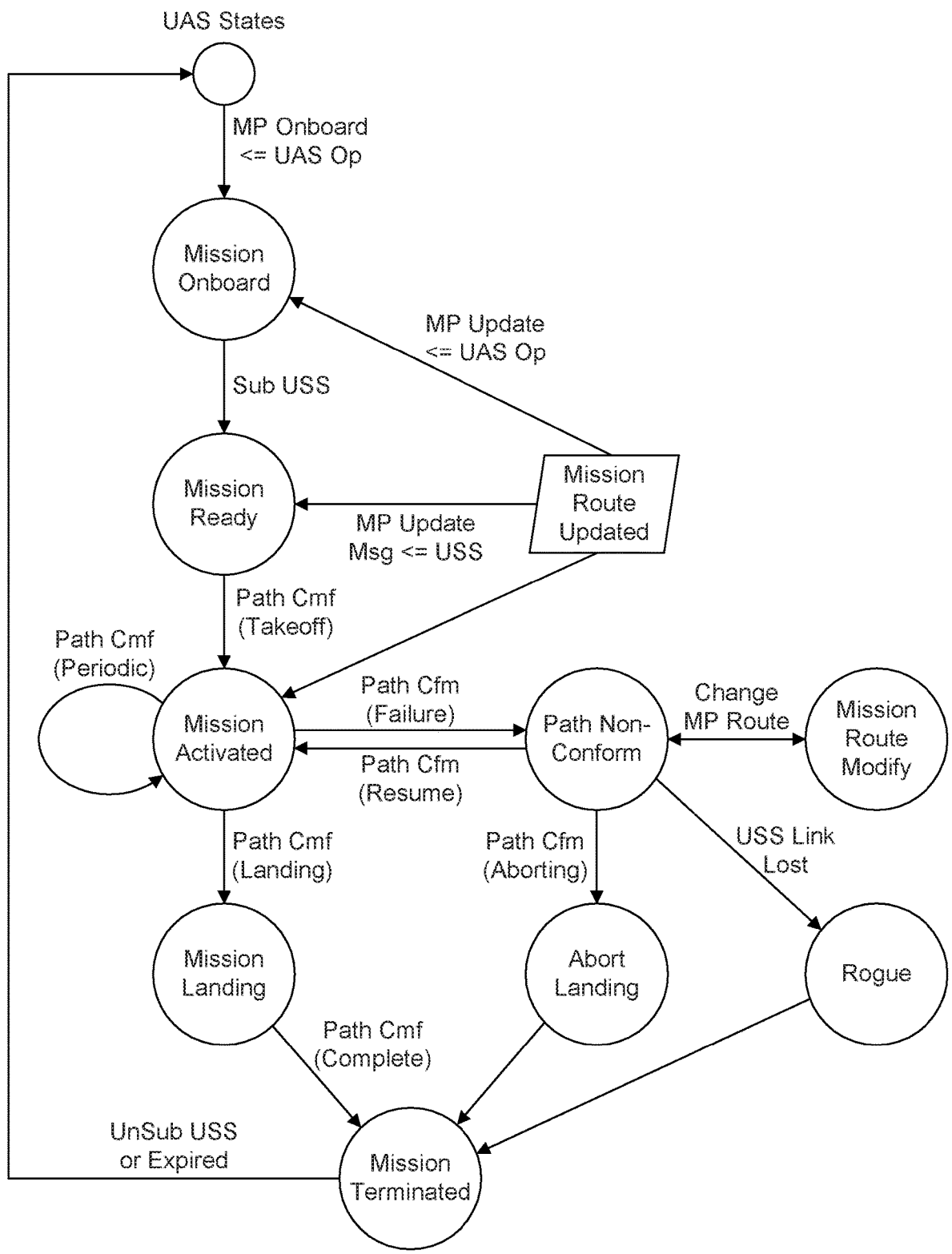
FIG. 11 is an illustration of UAS state during mission execution.

Referring now to FIG. 11, a diagram illustrating a UAS state during mission execution is shown. Compared to an ATM system, a UTM system may face many new challenges. Firstly, UASs may be operated in the Class G airspace, which is under 500 feet altitude. The space is very crowded not only with small manned aircrafts, airports, but also with land obstacles, such as high rises, trees, and terrain. The potential high density of UAS operations in Class G airspace may require the UTM system to monitor/control UAS flying position and speed much more precisely than ATM for manned aircrafts. To utilize the airspace capacity efficiently, the UTM system may need to fine tune the 4D paths (3D path plus time) in the airspace allowing more UASs to share the airspace and avoiding collisions at intersections. Unlike the ground traffic control, where the roads are deterministic, paths in the air are virtually formed, between any two waypoints, various ways may be formed dynamically. For example, a straight way may turn to a curved way. There is much more flexibility in the airspace path configuration and UAS mission planning on the configured paths. For airspace management optimization, the goal is to provide a maximum throughput for a given airspace volume, which is a harder problem to solve than ground traffic control.

Secondly, the variation of the UAS and mission types may further increase the dynamics of airspace management by the UTM system. The sizes and cruise speeds for UASs may be much more diversified than automobiles, separated paths may be needed for UASs with different profiles.

The mission requirement diversity may further complicate dynamics of the optimization problem. For example, a UAS application may require a UAS to visit to a specific waypoint and/or path at given time and for a period.

At TCL4, the UTM system may manage an airspace with high density UAS operations, which may be operated by different UAS operators and served by multiple UAS service suppliers (USSs). The UAS traffic management (UTM) may include an offline mission planning phase and a real-time execution phase for UAS operations. This disclosure aims to provide signaling protocols over the interfaces between UTM entities shown in FIG. 9, considering the above complexities.

Protocols of UTM systems may be specified for the interfaces between the UAS and the USS, UAS operator and USS, as well as between different USSs, respectively.

A UAS may be first registered to the UTM registration system according to procedures disclosed herein. A registered UAS may obtain a UTM certificate authorizing its usage of the UTM system. Then, the UAS may subscribe to a USS using one of methods specified herein. A subscriber UAS to a USS may set up a connection to the USS server with a USS certificate authorizing its eligibility to the USS services.

A UAS may get registration to UTM system and subscription to a USS indirectly via its UAS operator. The UTM protocols between a UAS and a subscribed USS to may be specified in detail below.

For UAS applications, there may be two major points of interest in an airspace. One is geo-fencing area, which may be a space with a 3D volume restricted to flight. The geo-fencing may be time-varying, and the space becomes a 4D volume, for example with a dynamic 3D volume. The other point of interest may be a waypoint that UAS operations need to or may visit. A waypoint may be considered as an airspace container of a geographical area used for a UAS application to perform a task. Without a loss of generality, it may be assumed that there is always a path between a pair of waypoints. In case, for example, the clear path is blocked by a geo-fencing area, it should always be possible to add transition waypoints until two waypoints being connected via a sequence of paths.

Figure 12:
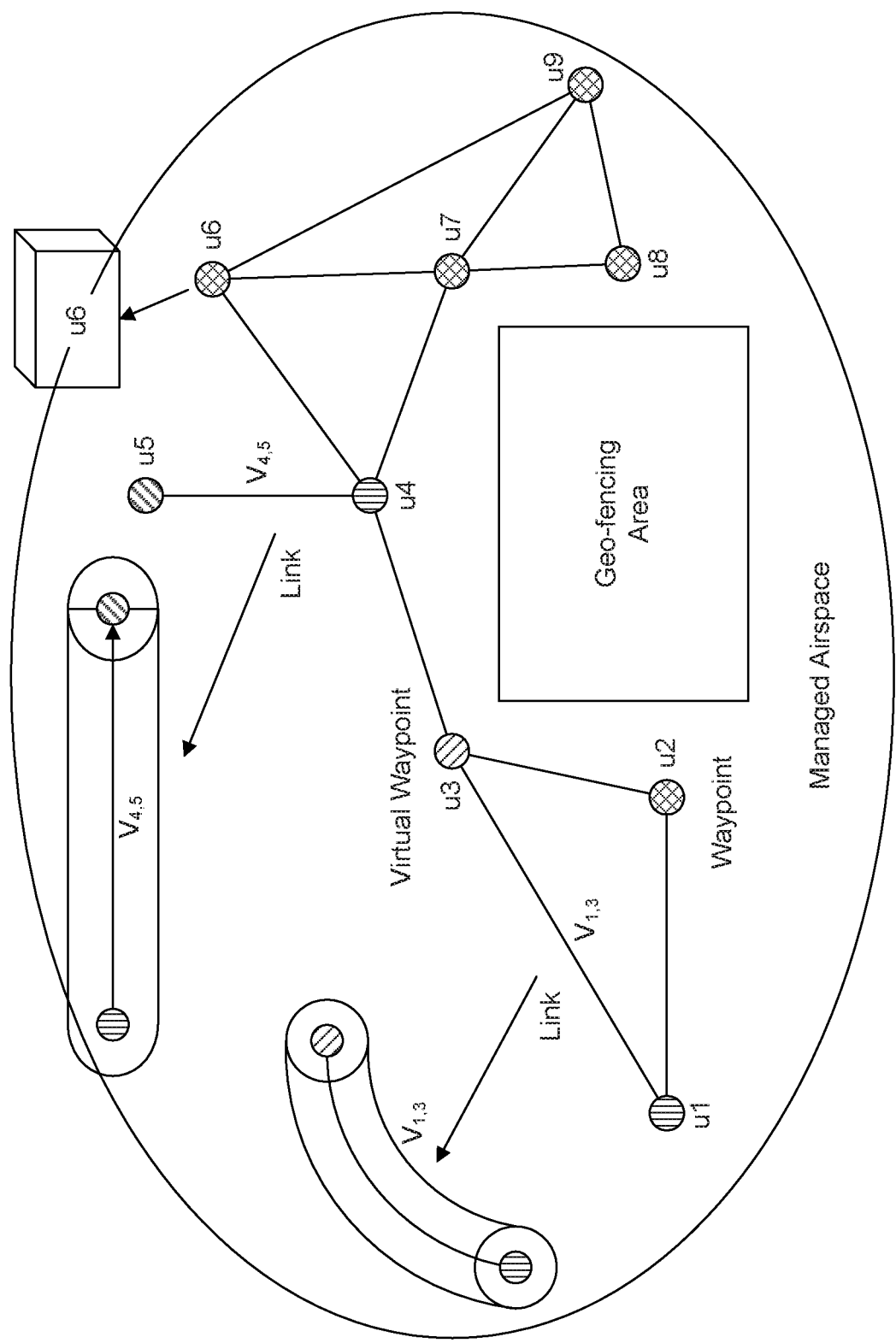
FIG. 12 is an illustration of a model of a managed airspace.

Referring now to FIG. 12, a diagram illustrating an airspace is shown. The airspace may be modeled as a set of K 3D waypoints, $U=\{u_k=(x_k,y_k,z_k), k=0, \ldots, K\}$, and a 3D graph connected by the paths, $V=\{v_{i,j}=(u_i, u_j), i,j=0, \ldots, K\}$. In general, a waypoint or a path may be a space of any 3D shape. For simplicity, a 3D waypoint may be modeled as a sphere with a radius r (i.e., $u_k=((x_k,y_k,z_k), r_k)$) and a 3D path as a cylinder with a radius w and a length of the distance between two waypoints (i.e., $v_{i,j}=((x_i,y_i,z_i), (x_j,y_j,z_j), w_{i,j}))$. A virtual waypoint without an application requirement may be used to connect waypoints with application requirements. For example, $u_3$ may be a virtual waypoint to connect $u_1/u_2$ to $u_4$.

FIG. 12 shows a number of possible paths between waypoints for illustration purpose. Path $v_{4,5}$ is a path between waypoints $u_4$ and $u_5$, which represents a 3D tube in the airspace that may accommodate UAS operations. Path $v_{1,3}$ is another path between waypoints $u_1$ and $u_3$, geographically, it is a curved 3D tube connecting them.

There may be multiple paths between two waypoints, for example, one straight and one curved, and two paths at different altitudes for a pair of waypoints with height. A label may be added to a path between two waypoints. Then the path set may be noted as $V=\{v_{i,j}=(u_i, u_j, l), i,j=0, \ldots, K\}$, where $l=0$ by default. A volume of an airspace may be determined by the shape and the size of an airspace element. For examples, a waypoint's volume $|u_i|=4/3*\pi r_i^3$, which is a radius-$r_i$ sphere, and a path's volume $|v_{i,j}|=l*\pi w_{i,j}^2$, which is a radius-$w_{i,j}$ and length-l cylinder.

UAS operations may be separated with a safe operation volume (SOV), which may depend on the type/class of the UAS, the required navigation performance (RNP) capability of the UAS, or the weather condition at a given time. For a waypoint with a given volume, a limited number of UASs may be accommodated to perform their tasks. In general, the capacity of a waypoint may be defined as the volume of the geographical area. The shape of the area may affect the capability of serving UASs, that is, the same volume size with different shapes may result different capacities. The capacity of a waypoint may be defined by the average number of UASs each with an average size that it may accommodate. For example, a capacity 4 means a waypoint may accommodate 4 average size UASs at a given time. Airspace capacity may also be defined by a distribution of different size of UASs and each size associated with number of corresponding UASs. An example is given in Table 1 for a waypoint A depending on the size of UAS.

TABLE 1

Airspace Capacity to Size of UAS

| UAS type/size | Waypoint-A Capacity |
|---|---|
| X-Small | Unspecified |
| Small | Up to 30 |
| Medium | Up to 10 |
| Large | 2 |

A path may be defined as a 3D passage for UASs to fly through between two waypoints. Like the waypoint, the capacity of a path may be defined as the number of average size UASs it may accommodate at a given time. Assuming a single lane path, the capacity is a function of the length of the path divided by the average separation distance for safe operation. The separation distance may also depend on the speed. In FIG. 12, $v_{1,3}$ is a curved tube and $v_{4,5}$ is a straight tube. Accordingly, these paths may have different speed limits, in accordance with FIGS. 6A-6B. Throughput is a function of speed and there is an optimal speed that gives the maximum throughput. If the speed limits for both may reach the optimal speed, they may get the same maximum throughput. The capacity of a path may be defined as the smaller value either at optimal speed or at speed limit of the path. Since the separation distance may also depend on other conditions, in general, a capacity of a path may be chosen under a given condition, including a cruise speed, or as a function of conditions. Both the capacity of a waypoint and the capacity of a path may vary at different time of day and under different context, such as weather conditions, time of day etc.

A virtual waypoint may not have capacity because it is defined as a waypoint without application requirements, so it may be a pass-through point for paths connected. It may be assumed that there may be no UAS stay at the virtual waypoint to perform UAS application tasks.

In general, an airspace element may be defined as a 3D geographical area of any shape (e.g., a waypoint or a path as defined above), and may have an attribute set, which may include one or more of the following. An RNP to indicate the airspace element may only be able to support a UAS operation if the UAS is capable to perform at same or lower RNP value of the airspace element. Compared to a manned aircraft RNP, the RNP for a UAS may have the following features. A much smaller scale in terms of distance, which may be from tens to hundreds of feet. For quadcopter and fixed wings, the scale may be largely different comparing to the size of the UAS. The variance of the navigation position distribution is much bigger. If a 1*RNP square be is defined as an area with the 95% confident level of position distribution, to reach 99.999% of confident level, a much bigger value may be required, instead of only a 2*RNP value for a manned aircraft. The errors contributed by NSE, FTE and PDE may be diversified from UAS to UAS, largely depending on the sensing capability of UASs. For a UAS to maintain an RNP may require a significant portion of total energy consumed by the UAS to fly. The RNP for a UAS may be largely varying based on its operational condition, including, for example, battery power left. Other parameters may include those described below.

Detect and Avoid (DAA) Capability may indicate if the airspace element may be operated under DAA solutions, which may imply local sensing and/or edge computing resource availability. An airspace element not capable for DAA may require larger capacity to support the same number of UAS operations at a given time.

A sharability level may indicate the airspace element may be shared or not by multiple UASs at a given time. For example, sharability may have 4 levels. Level 0 may be an exclusive element, level 1 may be that a sharable element by the same class of UASs, level 2 may be a sharable element by the same class of UASs and possibly in opposite direction traffic and level 3 may be a sharable element with no restriction. In general, a set of conditions may be profiled, and each condition may associate with a sharability level. A USS may consider a sharability level X of an airspace element based on many factors, including but not limited to, path prioritization, weather conditions, geo-fencing and privacy.

A blackout time may include specific hours and/or days not available for UAS operations. A delay variance may indicate a UAS flying through the airspace element may not be able to remain at an expected average speed. The duration of flying time through the airspace element may vary for the same UAS, which may be caused by change in weather condition, traffic situations, a curve and more external factors. The delay variance may be obtained from the statistics of historical operations.

A support-mission type may be an airspace element may be used only to certain type of missions. For example, a shortcut path is allowed only for a police drone but normally prohibited for non-emergency UAS.

A network resource information element may be used to define an available network resource for UTM and UAS applications, which may include, but not limited to, radio access resource and network computing resource. The network resource information element may provide a list of available base stations at the airspace element. The network resource information element may include an access node (eNodeB) ID and a tuple of resource description (e.g., committed-rate, excess-rate, packet-loss-rate, delay-threshold, jitter-threshold). Multiple eNodeBs may be available to the same airspace elements and the network resource may be a list.

The radio access resource may be provided by cellular network, satellite network and/or mesh network operators. The access media may be either in unicast, multicast or broadcast.

A Safe Landing Spots attribute may include a safe landing spot set may be specified for each airspace element. The rule of using the spot may be included as well.

In general, the airspace attributes may be functions of time and context conditions. For examples, the network resource is a function of time of day. In the peak working hour, the resource may be lower than the off-peak hour. A given safe landing spot may be available only at day time. The sharability level may depend on weather (e.g., wind) conditions. Table 2 shows airspace attributes.

TABLE 2

Airspace Attributes
Airspace Attributes

RNP,
DAA-CAPABILITY,
SHARABILITY-LEVEL,
BLACKOUT-TIME,
DELAY-VARIANCE,
SUPPORT-MISSION-TYPE,
NETWORK-RESOURCES,
SAFE-LANDING-SPOTS

TABLE 3

Airspace Network (Radio) Resource
Airspace Network Resource

ENODEB-IDS,
COMMITTED-RATE,
EXCESS-RATE,
PACKET-LOSS-RATE,
DELAY-THRESHOLD,
JITTER-THRESHOLD

An airspace hierarchy may be defined. An airspace waypoint is shown in Table 4, which may contain a center's coordinates, a volume descriptor and a set of airspace-attributes. A unique ID may be given since the center GPS coordinates may not be able to uniquely identify a waypoint if a waypoint has different shapes.

TABLE 4

Airspace Waypoint
Airspace Waypoint

ID,
CENTER,
VOLUME,
CAPACITY,
ATTRIBUTES

An airspace path may be a path between two waypoints in one direction, as shown in Table 6. A volume may represent a straight or a curved tube. A unique ID is given to differentiate possible multiple paths between two waypoints.

TABLE 5

Airspace Path
Airspace Path

ID,
START_WAYPOINT,
END_WAYPOINT,
VOLUME,
CAPACITY,
ATTRIBUTES

Based on the airspace model $S=(U, V)$, where $U=\{u_i\}$ is a set of waypoints and $V=\{v_{i,j}\}$ is a set of paths, a hierarchical structure of an airspace may be managed by one or more UAS service suppliers (USSs) in the UTM system.

A national or regional airspace consists of multiple zones $\{S_n\}$. A zone is an airspace $S_n=(U_n, V_n)$ consisting multiple segments. A segment may be a pair waypoints and the path in between $s_{i,j}=(u_{i,j}, v_{i,j,n}, u_{j,n})$ or, in general, a consecutive waypoints and paths, for example, in FIG. 12, a segment may be $s_{1,3}=(u_1, v_{1,3}, u_3)$ or $s_{1,3,4}=(u_1, v_{1,3}, u_3, v_{3,4}, u_4)$. The UTM may give a system wide unique ID for each airspace zone $S_n$. The UTM may define an airspace zone without a graphical model $S_n$ associated with, for example based on geolocation. The UTM may label give a unique ID to label each airspace segment, each path and each waypoint.

The capacity of a segment may be defined as the total capacity of paths on the segment. For example, per FIG. 12, $|s_{1,3}|=|v_{1,3}|$. One embodiment is to also include the capacity of the waypoints on the segment, however, the value may be the waypoint capacity divided by its degree (of vertex), because the waypoint capacity may be shared by multiple segments across it, then $|s_{1,3}|=|u_1|/2+|v_{1,3}|+|u_3|/3$. The segment capacity indicates the average number of UASs a segment may accommodate; therefore, the capacity may depend on many factors, such as weather, time of day etc.

The capacity of a zone may be defined as the total capacity of waypoints and paths in the zone. The zone capacity indicates the average number of UASs a zone may accommodate at a given time, therefore, the capacity may depend on the many context, such as weather, time of day etc.

A capacity of zone $S_n$ may be denoted as $|S_n|=\Sigma_i|u_i|+\Sigma_{(i,j)}|v_{i,j}|$. The capacity of a segment or a zone, i.e. the average number of UASs it may be able to accommodate at a given time, may be used as a key metric for the UTM system to keep the traffic flow under control.

Exemplary airspace attributes of segment and zone may be shown in the tables below. An airspace segment/zone may have attributes for all elements under it. The size (capacity) may be represented by the sum of the sizes of all airspace elements under it. However, the other attributes may be preempted by lower level value, meaning, for example, if a path RNP is given, it overwrites the RNP given at segment and/or zone level.

TABLE 6

Airspace Segment
Airspace Segment

ID,
ZONE-ID,
WAYPOINTS,
PATHS,
CAPACITY,
ATTRIBUTES

TABLE 7

Airspace Zone
Airspace Zone

ID,
DIMENSIONS,
CAPACITY.
LOCATION,
WAYPOINTS.
PATHS.
ATTRIBUTES

Before a UAS uses a USS it subscribes to, it may need to ask for the airspace framework that describes the airspace managed by the USS, so that the UAS may prepare the mission planning request accordingly.

In an embodiment, a UAS x requesting an airspace framework G for each operational airspace over the service connection from a USS y, may comprise a graph consisting of waypoints and paths. Each waypoint may be one or more of the following: a 3D waypoint being a sphere with a radius centered at a GPS coordinator; a 4D waypoint being a 3D waypoint plus a visit time and duration; a delay tolerant value for the visit time and the duration; a 5D waypoint being a 4D waypoint plus a minimum data rate requirement for the mission.

Each path may be one or more of the following: a 3D path being a cylinder between two waypoints with a radius; a path is being labeled if there may be multiple paths between a pair of waypoints; a 4D waypoint being a 3D path plus a starting time and an ending time and with a delay tolerant value for the starting time and ending time; a 5D waypoint being a 4D path plus a minimum data rate requirement for the mission.

A graph of segments and zones may have each segment being a sequence of waypoints and paths, with each path connecting a pair of consecutive waypoints. Each zone may be a geographic area, as a subset of a graph. The geographic area being may be defined by zip code.

An airspace attribute set, including, but not limited to, a cruise speed of each waypoint and each path. The cruise speed of a waypoint being the average speed of UASs flying through the volume of the waypoint. The cruise speed of a path being the average speed of UASs flying through the length of the path between starting waypoint to ending waypoint.

Each waypoint and each path may have a capacity. The capacity of a waypoint being a number of average size UASs it may accommodate at a time at cruise speed. A waypoint being sharable if the capacity being greater than 1. The capacity of a path may be a number of average size UASs it may accommodate at a time at cruise speed. A path being sharable if the capacity being greater than 1.

Cruise speed may correspond to each segment and each zone. The cruise speed of a segment being the average of the cruise speeds of the waypoints and paths in the segment, weighted by the capacity of the waypoints and paths, respectively, The cruise speed of a zone being the average of the cruise speeds of the waypoints and paths in the zone, weighted by the capacity of the waypoints and paths, respectively Each segment and each zone may have a capacity. The capacity of a segment is the sum of the capacities of all waypoints and paths in the segment. The capacity of a zone is the sum of the capacities of all waypoints and paths in the zone.

RNP of each waypoint and each path. The RNP being a set of values [$a_i$]. The RNP being a range [a, b]. UTM radio resource availability of each waypoint and each path. The availability being a maximum outage probability of command and control (C2) link.

A UAS x receiving UAS application request from its UAS operator, may comprise: a set of geographical locations (GPS coordinators) $G_m$ where the application is about to operate, with starting time and ending time, respectively. The starting time and ending time have a delay tolerance value T.

A UAS x may prepare a Mission_Planning_Request message by: mapping each location in $G_m$ to a waypoint or on a path in G; preparing the UAS platform to meet the requirement of RNP of waypoints and paths in G, and the UTM radio resource availability, including turning on sensors, turning alternative communication transceivers, such as satellite.

A UAS x may request the update of the airspace framework G in from USS y periodically.

Mission planning may be provided by a USS UTM function. Before a UAS operation starts, the UAS (or its UAS operator) must plan ahead by requesting the USS UTM service to validate the operation requirements, which is to find a mission route that covers the intended visiting waypoints and time constraints on the visiting time.

A UAS mission to a UTM system is a schedule of using certain airspace of a UAS application. The airspace may be specified as a graph with waypoints and paths as in the airspace framework.

A UAS x may send a Mission_Planning_Request for a mission k to the UTM service provided by a USS z it subscribes to, over a session established at the UTM1 interface between UAS x and USS z. The Request may be alternatively sent by the UAS operator y that operates the UAS x, over a session established at UTM2 interface between UAS operator y and USS z.

The Request may contain one or more of: mission waypoints, a 3D waypoint, a 4D waypoint, Waypoint visit type, a 5D waypoint type, multiple USSs, mission paths.

Mission waypoints may include a set $P_k = \{u_{j,k}\}$ is given, a waypoint $u_{j,k}$ is a geographical area that the mission should visit. A 3D waypoint may be a waypoint $u_{j,k}$ is a geographical area with any 3D shape. One embodiment is a sphere $u_{j,k} = ((x_j, y_j, z_j)_k, r_{j,k})$, where $(x_j, y_j, z_j)_k$ is the center and $r_{j,k}$ is the radius. The size of the 3D shape at any dimension may be specified as a random value obeying to a probability distribution. A 4D waypoint may be a waypoint $u_{j,k} = ((x_j, y_j, z_j)_k, r_{j,k}, t_{j,k})$ is a 4D point with a 3D shape associated with a timestamp $t_{j,k} = (tv_{j,k}, td_{j,k})$, indicating the mission should visit the waypoint at $tv_{j,k}$ for a duration of $td_{j,k}$. In general, both values may be a random number with a probability distribution. A 5D waypoint may be a waypoint $u_{j,k}$ is a 5D point with a 3D shape associated with a timestamp and a network resource requirement $R_{j,k}$. One embodiment is $R_{j,k}$ is a triple of (Average data rate, Peak data rate, Delay budget). The network resource $R_{j,k}$ may be a set of triples, each used for either the UTM service and/or a UAS application. A waypoint visit type may be a waypoint $u_{j,k}$ may have an attribute of visit type vType, differentiating the type of functions the mission k may perform at the waypoint. For example, vType∈{mandate, prefer}. The starting and ending waypoints may be usually with vType=mandate. A 5D waypoint with a visit type may be noted as $u_{j,k} = ((x_{j,k}, y_{j,k}, z_{j,k}), (tv_{j,k}, td_{j,k}), R_{j,k}, vType_{j,k})$.

A multiple USS field may include a waypoint set $P_k$ may be in multiple airspace zones $\{S_n\}$ managed under the same USS, if any one of airspace zone $S_n$ is not managed by the same USS, a separate Request may be sent by the UAS.

A mission paths field may include a path between two consecutive waypoints in the waypoint set is not specified, it assumes the mission may take any direct or indirect path managed by the USS. Alternatively, the UAS may need to take pictures along a direct path and a specific path may be included. A mission path content is shown in Table 9. The label indicates a specific path between two waypoints.

TABLE 8

Mission Waypoint
Mission Waypoint

CENTER-COORDINATES,
VOLUME, /*3D*/
VISIT-TIME,
VISIT-DURATION, /* 4D */
NETWORK-RESOURCE, /*5D*/
VISIT-TYPE,
AIRSPACE-ATTRIBUTES

TABLE 9

Mission Path
Mission Path

START-WAYPOINT,
END-WAYPOINT,
PATH-LABEL,
START-TIME,
END-TIME, /* 4D */
NETWORK-RESOURCE, /*5D*/
VISIT-TYPE,
AIRSPACE-ATTRIBUTES

A UAS may make a mission planning request with 4D and/or 5D waypoint and/or path requirements. A successful mission planning must include a mission route that satisfies the 4D/5D waypoint/path requirements.

A UAS x may send a Mission_Planning_Request message to a USS y's UTM service that may include a list of waypoints P in an airspace framework G. P may contain at least a starting waypoint and an ending waypoint. P may contain 4D or 5D waypoints. A list of paths V in an airspace framework G may be an empty set. V may contain 4D or 5D paths.

The UAS x may receive a Mission_Planning_Response message from USS y that may include a mission route consisting of a sequence of waypoints and paths (e.g., waypoints in P and paths in V). If waypoints in P are 4D waypoints, the waypoints in the route may also be 4D, satisfying the visit time and duration required in P within the specified delay tolerant value. If paths in V are 4D paths, the paths in the route may also be 4D, satisfying the visit time and duration required in V within the specified delay tolerant value. If waypoints in P are 5D waypoints, the waypoints in the route may also be 5D, satisfying a provisioned data rate more than the required minimum data rate in P. If paths in V are 5D paths, the paths in the route may also be 5D, satisfying a provisioned data rate more than the required minimum data rate in V. The UAS x may send a Mission_Planning_Confirm message to USS y upon receiving the mission route.

If there are multiple mission routes $\{d_i\}$, the UAS x may choose a mission route $d_i$ using one or more metrics, including, minimum number of waypoints in the mission route, shortest distance of the total paths in the mission route, or minimum total time to complete the mission route. The UAS x may send a Mission_Planning_Confirm message to USS y after choosing the mission route $d_i$.

A UAS Capability may specify the parameters of the UAS executing the mission k. It may contain one or more of the following fields.

An RNP Capability Range field may be a range [a, b] or a set of value $\{a_i\}$ indicating a range of RNPs that a UAS may be able to operate. A UAS's RNP may vary largely based on the hardware build, GNSS/inertial capabilities, and digital maps equipped. For example, if a UAS is equipped with a centimeter accuracy GPS, its RNP may be very small, meaning it is capable to flight more precisely along the planned route. A default RNP capability value for a UAS may be deliverable from its uVIN under a standardized context. But in general, the RNP may vary not only based on its equipment but also under different context of the mission. For examples, a mission may have a big payload (carrying a package) that may change the ability of the UAS to maintain its position; the UAS is low on its battery that affects its sensors and maneuverability.

An RNP Usage Model field may specify how UAS RNP Capability Range is used. The UAS RNP capability may be used by the UTM system to determine which airspace segment is suitable for a mission and which is not. A UAS may indicate that the maximum RNP in the range [a,b] is preferred because it may require less onboard sensors to be turned on. In another embodiment, each RNP capability value $a_i$ is associated to a mission context, for example, day time, night time, windy condition etc.

A DAA Capability Value may be a number referring to a DAA profile including protocol used and corresponding parameters. The DAA Capability Value may explicitly include a set of 3D volumes used by a DAA solution to perform collision avoid resolution advisories (RAs). Each 3D volume may be a function of cruise speed of the UAS. Usually, the faster, is bigger. In one embodiment, the value indicates that the UAS does not support DAA. The volume set may include one or all of collision volume, alerting volume and detection volume.

An Operational Capability field may include one or more of average cruise speed, maximum speed, the turning speed at cruise speed, acceleration/deceleration rate, maximum service time, maximum length on travel distance, and battery or fuel level.

A Platform Type field may indicate the UAS's hardware platform and software platform, providing additional information that uVIN may not provide. The additional information may include one or more of engine type, wing type, sensors, firmware and software versions, communication capabilities, and data service subscriptions. Table 10 is the UAS Capability.

TABLE 10

UAS Capability
UAS Capability

RNP-CAPACITY-RANGE
RNP-USAGE-MODEL
DAA-CAPABIUTY
OPERATION-CAPABILITY
PLATFORM-TYPE

A UAS capability may be used in mission planning. The RNP and DAA capabilities may be indicated in the request and the approved mission route may have to match the RNP and DAA capabilities and the airspace attributes.

A UAS may send a Mission_Planning_Request message to a USS y that includes one or more of a starting waypoint $p_s$ and an ending waypoint $p_e$, a minimum RNP capability value a indicating the UAS x is capable to remain within a meters from a targeted navigation position, and a DAA capability level f.

The UAS x may receive a Mission_Planning_Response message from USS y that includes one or more of a mission route with a sequence of waypoints and paths (including $p_s$ and $p_e$), any waypoint or path in the mission route, and a maximum allowed RNP (e.g. greater than a).

The UAS x may send a Mission_Planning_Confirm message to USS y upon receiving the mission route. Mission Attributes may include mission specific parameters that may or may not be related to the UAS capability IE. Mission Attributes may include one or more of the following.

A Mission Type may represent a standard value that indicates, for example, a UAS is a police drone, which may have a higher priority. Popular mission types may include package delivery, image/video surveillance, and agricultural work.

A Sharability Level may include a priority requirement on sharing airspace with other operations. For example, the sharability may have 4 levels. Level 0 is that an exclusive path is required, level 1 is that a sharable path with same class of UASs, level 2 is that a sharable path with same class of UASs and possibly in opposite direction traffic and level 3 is a sharable path with no restriction. The sharability may be implied by Mission Type. For example, a police drone may automatically be assumed sharability level 0.

A Delay Variance may be a value that specifies the flexibility on the visit time and/or visit duration in the 4D waypoint set $P_k$. Four levels of variances may be given on the requested visit time and/or visit duration on waypoints. Level 0 may require a strict deadline on the absolute time. Level 1 may require a strict deadline (variance value 0) on relative time from takeoff time. Level 2 may require a flexible deadline with variance level 1. Level 3 may require a flexible deadline with variance level 2. Specific variance values may be given for visit time and duration. When the value is 0, the timestamps relative to takeoff time may be enforced. When the value equals MAX, it may be a best effort mission. When the value <0, the timestamps may be enforced at absolute clock value.

A Network Resource Requirement may indicate the data rate and delay constraint to keep the mission operation alive, for example, the requirement for keep-alive and/or command and control (C2) messages. This network resource may be required for the overall mission regardless of UAS's location on airspace segments. With this value, the network resource $R_{j,k}$ in a 5D waypoint j may only indicate the payload requirement at j. For example, a package delivery mission may have $R_{j,k}=0$ for all waypoints. In other words, only 4D waypoint is required for Mission Waypoint Set $P_k$.

TABLE 11

| Mission Attributes |
| --- |
| Mission Attributes |
| TYPE, |
| SHARABILITY, |
| DELAY VARIANCE, |
| NETWORK RESOURCE |

Mission attributes may be used in mission planning. The sharability level and delay variance value may be required in the request. The approved 4D mission route may satisfy these requirements.

A Mission Planning Request may include Mission Attributes. A UAS x sending a Mission_Planning_Request message to a USS y, may include one or more of a starting waypoint $p_s$ and an ending waypoint $p_e$, a starting time $t_s$ and an ending time $t_e$, a sharability level a, and a delay variance value b.

A UAS x receiving a Mission_Planning_Response message from USS y, may receive one or more of: a mission route with a sequence of waypoints and paths, including a starting waypoint $p_s$ with a starting time $t_s'$ and ending waypoint $p_e$ with an ending time $t_e'$, satisfying $|t_s'-t_s|<=b$, $|t_e'-t_e|<=b$; and any waypoint or path in mission route, satisfying a sharability level $>=a$.

A UAS x may send a Mission_Planning_Confirm message to USS y upon receiving the mission route. The Mission Planning Request message may include data fields as shown in Table 12.

TABLE 12

| Mission Planning Request |
| --- |
| Mission Planning Request |
| UAS-OPERATOR-ID, |
| UAS-ID, |
| UAS-CAPABILITY, |
| MISSION-ATTRIBUTES, |
| REQUEST-WAYPOINTS, |
| REQUEST-PATHS |

A Mission Planning Response may be formed. If at least one mission route is found, the mission planning request may be granted. A Mission_Planning_Response may be formed based on the mission route $Q_k$. The content of the Mission_Planning_Response are described herein.

A UAS x or a UAS operator y may receive a Mission_Planning_Response from a USS z.

The Response may contain a mission ID, Pseudonyms, Planned Mission Routes, an Optimal Mission Route, or the like.

A Mission ID may be a unique identification in a USS for a given mission k, $mID_k$. If the mission k is operated by $opID_y$ and executed by $uVIN_x$, a USS issued certificate may be given and attached in Response, bundling $opID_y$, $uVIN_x$ and $mID_k$.

The USS may use a security management system to generate a set of pseudonyms for each mission, which may be used by the UAS to broadcast its position, speed and other mission execution related information. The broadcast information may be verified by the pseudonym as legitimate but may not be traced to a true identity of a UAS, unless by an authorized entity, such as a police drone or UAS operator. Therefore, the privacy of a UAS may be protected. For example, a person may not be able to identify a UAS that comes to a particular location every day at 10 AM being the same UAS.

The UAS x that receives a Request may be able to execute the mission using a 4D/5D planned mission route. A 4D planned mission route satisfying requirements or a 5D planned mission route satisfying requirements may be selected as a planned mission route for a given Mission_Planning_Request.

There may be multiple routes available for a mission. There may be multiple criteria on an optimal route, including one or more of minimum total time, minimum total route length, and lowest network resource requirements. When at least one available route $Q_k$ is found for the mission k, the USS may send a Mission_Planning_Response over the UTM1 interface to the UAS or UTM2 interface to the UAS operator, with a mission ID and the planned route set $\{Q_k\}$. Otherwise, the Response may contain the mission ID and a failure status. One reason of failure may be that the route not available.

TABLE 13A

Mission Planning Response Success
Mission Planning Response

MISSION-ID,
UASOPERATOR-ID,
UAS-ID,
USS-CERTIFICATE,
PSUEDONYMS,
MISSION-ROUTES, /* 4D, 5D */
MISSION-ATTRIBUTES,
STATUS = SUCCESS

TABLE 13B

Mission Planning Response Failure
Mission Planning Response

MISSION-ID,
STATUS = FAILURE,
CAUSE = (NO ROUTE . . .)

The mission attributes may indicate the attributes granted by USS, and may be different if they meet the requirements in the Mission_Planning_Request. For example, it may be acceptable if more network resources are granted than what is requested.

A Mission Route may be across Multiple Zones. If the waypoint set $P_k$ is across multiple zones, the mission route $Q_k$ may have mission segments belongs to different zones. But if they all managed by the same USS, a pair of request/response may serve the mission planning task.

A UAS x or a UAS operator y may receive a Mission_Planning_Response from a USS z with a partial planned route, that is, a route only covering partial waypoints at the beginning of the waypoint set $P_k$ in Mission_Planning_Request. The planned route set $Q_k$ may contain only a starting time for the first waypoint (source waypoint), which may indicate at least partial planned route may be delivered before the starting time.

A partial mission route may be returned in the mission planning response. As a special case, the returned mission route may cover at least the beginning waypoint/path in the mission planning request.

A Mission Planning Response may include a Partial Mission Route. In one embodiment, UAS x may send a Mission_Planning_Request message to a USS y, comprising: a starting waypoint $p_s$ and an ending waypoint $p_e$ and a starting time $t_s$ and an ending time $t_e$.

The UAS x may receive a Mission_Planning_Response message from USS y, comprising a mission route of a sequence of waypoints and paths, including a starting waypoint $p_s$ and a starting time $t_s$. A flag f=1, may indicate a route is a partial route. The UAS x may send a Mission_Planning_Confirm message to USS y, upon receiving the mission route.

A UAS may receive an Aggregated Mission Route. A UAS x or a UAS operator y may receive a Mission_Planning_Response from a USS z with a mission route only providing aggregated information at segment or zone level without checking the path capacity. In this case, a segment or a zone may be considered as an abstract waypoint on the route.

For some missions, a precise waypoint to waypoint, path by path route plan may not be necessary. Due to external factors, such as weather, light and dynamic geo-fencing, a mission planning with a precise 4D/5D route assignment may be prohibited or short lived. A USS may select an abstract route $Q_k$ for mission k without checking the capacity constraints of each waypoint and/or path. Instead, the USS may perform a segment capacity check or a zone capacity check using one or more of a Segment's Capacity Check $\Sigma_k$ SOV$_k$*step $(ts_{i1,j1,k} - te_{i2,j2,k}) \leq |S_{(i1, \ldots, j2)}|$ and a Zone's Capacity Check $Z_k$ SOV$_k$*step $(ts_{i1,j1,k} - te_{i2,j2,k}) \leq |S_n|$, where $ts_{i1,j1,k}$ is the time the mission k's UAS enters to the segment/zone, and $te_{i2,j2,k}$ is the time the mission k's UAS leaves to the segment/zone. The total number of UASs weighted by SOV may not exceed the capacity of a segment or a zone. $Q_k$ may only contain the segment IDs and zone IDs and corresponding starting and ending times without detailed paths.

The capacity of segment/zone may be defined as the sum of capacities of all waypoints/paths. One embodiment is to obtain the capacity of a segment or a zone via statistics of historical data or simulation.

TABLE 14

Aggregated Mission Segment/Zone
Aggregated Mission Segment

SEGMENT-ID,
ZONE-ID,
START-WAYPOINT, /*3D */
END-WAYPOINT, /*3D*/
START-TIME, /*4THD*/
END-TIME, /*4THD*/
NETWORK-RESOURCE, /*5TH D*/
SAFE-OPER-VOLUME,
AIRSPACE-ATTRIBUTES

An aggregated segment is depicted in Table 14. The visit time of the first waypoint and last waypoint may be given, but only 3D waypoints and paths are given in between. In a special case, if segment-ID is 0, it may indicate an aggregated zone.

An aggregated mission route may be returned in the mission planning response. The mission route may be a sequence of segments and/or zones instead of a sequence of waypoints and paths of airspaces, providing the starting and ending waypoints are included in the first and the last segments/zones, respectively.

A UAS x may send a Mission_Planning_Request message to a USS y comprising: a starting waypoint $p_s$ and an ending waypoint $p_e$; a starting time $t_s$ and an ending time $t_e$; and or a delay variance b for starting and ending times.

The UAS x may receive a Mission_Planning_Response message from USS y comprising a mission route of a sequence of segments and zones, including: the first segment containing the starting waypoint $p_s$ and a starting time $t_s' < t_s + b$; the last segment or zone containing the ending waypoint $p_e$ and a ending time $t_e' < t_e + b$. A flag f=2, may indicate the route being an aggregated route.

The UAS x may send a Mission_Planning_Confirm message to USS y upon receiving the mission route.

The UAS x or a UAS operator y may receive a Mission_Planning_Update from a USS z with an updated mission route $Q_k$ and/or corresponding airspace attributes.

The UAS x or a UAS operator y may send a Mission_Planning_Confirm from a USS z, confirming the acceptance of the mission route and corresponding airspace attributes for the mission k, either from Mission_Planning_Response or Mission_Planning_Update messages.

The UAS x or a UAS operator y may receive more than one routes in a Mission_Planning_Response or Mission_

Planning_Update from a USS z. The UAS x or UAS operator y may choose one preferred route in the Mission_Planning_Confirm message.

A UAS may receive a Mission Plan On-Boarding. If the mission planning is not performed by a self-operated UAS, a UAS x may receive a Mission Plan On-boarding Request over a UTM3 interface from its UAS operator y before the starting time of mission k. The message may include: a USS Server Address, Mission ID, Mission Route, Partial Route and Aggregated Route.

A USS Server Address may be needed by a UAS in order to determine who manages the planned mission k. A network address, such as an IP address, a URL, is given in the Mission Plan On-boarding message so that the UAS may be able to subscribe the USS service. In one embodiment, the USS server address is derivable from the USS-ID.

A mission ID may uniquely identify the mission k by the USS. The UAS may use the mission ID to retrieve the planned mission route and mission attributes from the USS before and during the mission execution. The planned mission route $Q_k$ may be available at the UAS operator y and may be included in the message, A Partial Route may be a mission route that contains only partial waypoints in the set $P_k$ of the Mission_Planning_Request, and at least a starting time of the first path departing the first waypoint. The On-Boarding Request may also include a certificate containing the UAS ID $VIN_m$, UAS's USS-certificate $PubKey_m$, and the mission ID $mID_k$ signed by the UAS operator, indicating the UAS is authorized for mission k.

An Aggregated Route may be a mission route may contain segments without specific timestamps on waypoints and paths, or zones without specific segments.

TABLE 15

| Mission Pan On-Boarding Request Mission Plan On-boarding Request |
| --- |
| MISSION-ID, UASOPERATOR-ID, UAS-ID, PSEUDONYMS, MISSION-ROUTES, /* 4D, 5D */ MISSION-ATTRIBUTES |

The UAS may send a Mission_Plan_On-boarding_Response over UTM3 interface to its UAS operator after it is ready for flight. The Response may contain the mission ID $mID_k$ signed by the private key of the UAS, $PriKey_m$. If UAS operator y receives a failure or timeout for the Response, it may need to look for another UAS of the same class/type to execute the mission. The Mission Plan On-boarding Request may be sent to UAS over UTM3 interface between any time after the mission plan is made and the mission execution starts.

After the UAS operator completes the Mission Plan On-Boarding when an individual UAS m is designated for the mission, it may send a Mission Planning Confirm to the USS over UTM2 interface, with the $mID_k$ and $uVIN_k$ (=$VIN_m$) signed by UAS operator. The USS may know which particular UAS is bundled with the mission k (just-in-time bundling UAS).

Based on the Mission_Planning_Response or the Mission_Plan_On-boarding_Request received, a UAS x may use the mission route $Q_k$ and mission attribute set to check the compatibility of its platform version and status, service subscription, authentication status, service authorization and resource availability (e.g., battery etc.). For example, with a given RNP requirement, the UAS may need to turn on certain inertial sensor, with a given DAA requirement; the UAS may need to turn on certain external sensor. The sensor usage may affect the UAS battery life and then the flight distance.

A UAS may receive a mission plan for mission k from either Mission_Planning_Response or Mission_Plan_On-boarding_Request messages. The message may contain a mission route $Q_k$, which at least indicates a starting time of the mission $ts_{0,k}$.

Before $ts_{0,k}$, the UAS may need to subscribe to the USS who has granted the mission k if it has not yet to do so. The address of the USS may be obtained either in the On-Boarding Request message or from a method of publishing of USS services.

UAS x may then establish a UTM connection, such as a command and control (C2) link, to the USS z for a mission k before taking off. The connection may be used for UAS to report its status and to receive the mission related command and control data from the USS. In one embodiment, the UAS x may maintain the connection (C2 link) via its UAS operator y.

A UAS may receive a Path Conforming Configuration. For different missions and on different airspace path, a UTM system may require different kinds of path conforming reports. Therefore, before executing a mission k, a UAS x may make a Path_Conforming_Configuration_Request with mission ID to the USS z to configure the reports for the mission.

The UAS x may receive Path_Conforming_Configuration_Response message. The Response message may include a Path Conforming Profile comprising: a Report Data Set, a Report Type, a Report Period, a Report Interval, a Maximum non-report Interval, an Event Type and a Contingent Action Set. A Path Conforming Profile may be used by the protocol of UAS to report its status to USS, it may contain: A Report Data Set may contain one or more of the UAS's current position, future intent for a given period, history of path non-conforming events, the operational status, battery life in time or distance to travel. A Report Type may indicate that the report is periodic or event triggered. If event triggered, the event set may be valid but the report interval may be null. A Report Period may indicate a length of report time with starting time and ending time or a duration (assuming starting time is immediate). A Report Interval may be an interval for a periodic report. A Maximum Non-report Interval may indicate that a UAS is considered loss of contact, or rogue if there is no report after this interval. An Event Type may be a path non-conforming event may trigger a report to USS. A Contingent Action Set may comprise a set of actions corresponding to any of non-conforming status, including loss of contact (i.e., no report after maximum non-report interval or non-navigation period). A Path Conforming Profile shown in Table 16 may be given per airspace element (e.g., waypoint, path, segment, zone) or for the whole mission without differentiation. In one mission route, several profiles may be specified, indicating the different report configurations required by the USS for different airspace elements. A Path Conforming Profile Set may be provided. For each mission route, a profile set may be used. One for certain number of airspace elements. For example, profile_1 may be used for segments 1 to 5 under zone 1, profile 2 may be used for segments 6 and 7 under zone 1, and profile 3 may be used for the whole zone 2.

TABLE 16

Path Conforming Profile
Path Conforming Profile

PROFILE-ID
REPORT-DATA-SET,
REPORT-TYPE,
REPORT-TIME-PERIOD,
REPORT-INTERVAL, /* periodic */
MAX-NONREPORT-INTERVAL,
CONTINGENT-ACTIONS In the Response message, a set of Path Conforming Profiles (PCP) may be given. The mission route Qk may be included with an extended airspace-attributes element as shown in Table 17 with a PCP-ID. If an airspace element needs no other update, only the PCP-ID field may be present. If the profile is used for the whole segment or whole zone, the waypoint and path lists may be null value. The path conforming configuration may be given at whole segment or zone level.

TABLE 17

Extended Airspace Attributes with PCP-ID
Extended Airspace Attributes

RNP,
DAA-CAP ABILITY,
SHAREBILITY-LEVEL,
BLACKOUT-TIME,
DELAY-VARIANCE,
SUPPORT-MISSION-TYPE,
NETWORK-RESOURCE,
SAFE-LANDING-SPOTS,
PCP-ID

A Path Conforming Configuration message (PCCM) may be as shown in Table 18.

TABLE 18

Path Conforming Configuration Response
Path Conforming Configuration Response

PCP-SET,
MISSION-ROUTE {
....
EXTENDED-AIRSPACE-ATTRIBUTES}

A path conforming report may be configured between a UAS and its USS. A Path Conforming Profile (PCP) may be specific to an airspace element, at waypoint, path, segment or zone level.

A UAS x may send a Path_Conforming_Configuration_Request message to a USS y, including a mission ID (mID) for a planned mission.

The UAS x may receive a Path_Conforming_Configuration_Response message from USS y comprising: a set of Path Conforming Profile (PCP) L, each PCP containing: a PCP ID, pID≠0; a path conforming report data bitmap; indicating the required report items including at least position and speed of UAS x; an event type indicating the report is either periodic or triggered by a particular event; a report interval for periodic report; a number of report times for event triggered report. Each waypoint, path, segment and/or zone of the mission route corresponding to mID may have a PCP ID field in their airspace attribute set. The PCP ID field may be either a value in the PCP set L, or zero.

A UAS may receive mission route and attributes update from a Mission_Planning_Update from the subscribed USS. The Update may be piggy-backed by a Path_Conforming_Configuration_Response or vice versa.

The USS may send only one segment of $Q_k$ ahead of time to the UAS in real-time. The USS may have a full control for the UAS on route, and the UAS may be automated only within one airspace segment. The USS may send one zone of $Q_k$ ahead of time to the UAS in real-time. The USS may have full control of the UAS on route between airspace zones and UAS may be automated within the airspace zone. For just-in-time mission route update, the PCP-ID may be given in the extended airspace attributes for the updated portion in the mission route.

A UAS may send a Path Conforming Report. The automation of a UAS within either an airspace segment or a zone does not mean the UAS is not managed by the USS. The following path conforming protocol ensures the UAS follows the route $Q_k$ planned by the USS.

The USS server may receive a Path Conforming Report over UTM1 interface from a UAS m. The Report may include a UAS ID (or pseudonym), a PCP-ID, and the current state of the UAS. At a given airspace location, the Report message may contain data specified in the report-data-set in the PCP for the airspace element. The report data set may contain the mission ID, the GPS position and the speed of the UAS. The report data set may also include the intent for future and/or past statistics data between two reports. This may be referred to as status data set, Dm. The Report may also include the RNP capability of the UAS if the UAS fails the initial value due to its current context.

The Report may be periodic with an interval $T_k$. $T_k$ may be determined by either UAS or USS or negotiated by both. $T_k$ may be adjusted based on the context, such as speed of UAS, time of day etc.

TABLE 19

Path Conforming Report

Path Conforming Report
UAS-ID,
PCP-ID,
STATE,
STATUS-DATA

A periodic Report may need to include multiple data points if the UAS flights across multiple segments/zones in interval $T_k$. The $T_k$ may have enough reports for the USS to know the UAS is conforming with the planned path. The $T_k$ may be determined by the geographical distance $d_k$, that is, $T_k \le d_k/S_k$, where $s_k$ is the speed of UAS.

The Report may be served as or overloaded with a keep-alive message. The PCP may be used in the path conforming report message. The PCP of a lower level airspace element may preempt the higher level PCP.

In an embodiment, a UAS x may send a Path_Conforming_Report message to a USS y when UAS is at a waypoint or a path on the mission route. The Path_Conforming_Report message may comprise a data set indicated by the PCP specified for the waypoint or the path. If the PCP-ID field is zero for the waypoint or the path, the value in PCP-ID field of the segment may connate the waypoint or the path being used. If the PCP-ID field is zero for the segment as well, the value in PCP-ID field of the zone may connate the waypoint or the path being used. If the PCP-ID field is zero for the zone as well, the default PCP may be used.

A default PCP may require a periodic report comprising a data set including at least the position and speed of UAS x.

TABLE 20

Sample Non-Conforming Event Type

| Event Code | Event Definition |
|---|---|
| K1 | The absolute value of RNP error is greater than a threshold 'x'. This is considered as an RNP error event. |
| K2 | RNP (error) for the current time interval Ti is more than the average of the previous x time intervals by y %, where x is a positive integer, and y is any positive real number. More generally, the triggering event may be stated as: $RNP_i > m * f(RNP_{i-1}, RNP_{i-2}, \ldots RNP_{i-K})$, where $RNP_i$ denotes the RNP error currently experienced in interval-i, f(.) is any function (e.g. maximum, average etc.,), m = 1 + y %, and K is a positive integer, indicating the window size. Note: Occurrence of this event may signify inclement weather conditions such as wind etc., which may cause the UAS to drift from its scheduled path. |
| K3 | The absolute value of the no-navigation time (lost report) is greater than a threshold 'y' seconds. This is considered as a non-navigation event. |
| K4 | $N_i > m * f(N_{i-1}, N_{i-2}, \ldots N_{i-K})$, where $N_i$ is the number of non-navigation event currently experienced in interval-i, f(.) denotes any function, and m is a positive real number, and K is an ineger. |
| K5 | Time duration between consecutive non-navigation events is less than a threshold 't' seconds. More generally, this may be stated as follows: Let $E_i$ be a non-navigation event of duration $t_i > 0$ seconds (i = 1, 2 . . . ). Let $T_i$ be the time duration between two consecutive non-navigation events $E_i$, and $E_{i+1}$. Note that the events may happen in the same or different intervals. The triggering event is then denoted as: $T_i < m * f(T_{i-1}, T_{i-2}, \ldots T_{i-K})$, where f(.) is any function (e.g., average, maximum, minimum etc.,), m is any positive integer, and K is an integer? |
| K6 | The number of times that RNP error events (K1) has been greater than a threshold for the last 't' seconds. Here, t represents the time to trigger threshold. |
| K7 | The number of times that the RNP error has been greater than a threshold in the last 'N' time intervals, where N > 0 is a positive integer. |
| K8 | The number of times that the non-navigation event has occurred in the last t (t > 0) seconds is greater than a threshold N |
| K9 | The number of times that the non-navigation event has occurred in the last m > 0 time intervals, is greater than a threshold X. |
| K10 | The UAS predicts based on the current speed, and the position in the current segment that it may not be able to get to its next segment within the designated time considering the specified hysteresis for the next. |
| K11 | The RNP of the current time interval is an 'rnp offset' worse than the previous time interval(s) for a duration of t seconds. More generally, this event may be triggered when the following condition is satisfied: $RNP_i < f(RNP_{i-1}, RNP_{i-2}, \ldots RNP_{i-K})$ + offset, where f(.) is any function (max, min, average etc.,) |

A Path Non-Conforming Report may be used when a path does not confirm. The event based report may be triggered by, but not limited to, any situation shown in Table 20 that the UAS encounters, such as taking off and landing, and/or failure to conform the path RNP with one of following reasons: exceeding a threshold of period, exceeding several times or a combination of both during past T seconds.

The Report may also indicate, in the PCP's report type, that an overloading of the keep-alive message or periodic information broadcast signal (PIBS) message. The USS may verify the conformation of UAS x's real-time path and the mission route $Q_k$ (e.g., UAS x conducts mission k). Various algorithms may be implemented to compare the real-time path and the planned path.

The UAS may receive either mission route modification or mission aborting and take corresponding actions, respectively.

A UAS x flying on a path with maximum RNP a, an ending waypoint $u_e$ and an ending time $t_e$, on a mission route may send a Path_Conforming_Report with a EventType=periodic if its position is within a radius a tube centered by the center line of the path. A Path_Conforming_Report with an EventType=failure may be sent if its position is: outside of the radius a tube over K times in last T seconds, outside of the radius a tube over a threshold of total time $T_f$ in last T seconds, or outside of the radius a tube for a threshold of distance $D_f$ or at a position p at time t, and distance $(p, u_e)/(t_e-t)$ >maximum cruise speed.

A UAS x may receive a Path_Conforming_Control message from USS y comprising: a modified mission route with a path with updated ending waypoint $u_e$ and ending time $t_e$, or a mission aborting command and a contingency plan including an emergency landing spot.

The UAS x may send a Path_Conforming_Report message to USS y comprising: an EventType=periodic if a modified mission route is received or an EventType=landing if the mission aborting command is received.

The USS server may send Path_Conforming_Control over UTM1 interface to the UAS m. The Control may contain an acknowledgement for the Report and require the UAS do nothing. The Action may contain alerting for non-conforming, correction command and/or safe landing command etc.

The Path_Conforming_Report and the Path_Conforming_ Control may be periodic messages between a UAS in mission and the USS server. In one embodiment, the Control may be less frequent than the Report when the real-time path conformed well to the planned path.

The Mission_Plan_Update or Path_Conforming_Configuration from the USS server may piggy-back the Path_Conforming_Control, or vice versa.

TABLE 21

Path Conforming Control

Path Conforming Control
USS-ID,
UAS-ID,
CONTROL-DATA

Some exemplary Path Conforming Report examples are described herein. Periodic reporting may be used. Tables 22A and 22B illustrate a USS configuring a periodical reporting of UAS's RNP every 0.5 seconds for a path containing one zone (zone-id-1) with two segments segment-id-1, and segment-id-2 of segment duration 100 second and 50 seconds respectively. In the Path_Conforming_ Configuration message. Two Path_Conforming_Profile (PCP) ID=1, 2 are defined.

TABLE 22A

Path Conforming Profile ID = 1, 2 (Report Time 100 s)
Path Conforming Profile

PROFILE-ID = 1,
REPORT-DATA-SET = {RNP ...},
REPORT-TYPE = PERIODIC,
REPORT-TIME-PERIOD = 100 S,
REPORT-INTERVAL = 500 MS,
MAX-NONREPORT-INTERVAL = 5000,
CONTINGENT-ACTIONS = {LOST: IGNORE}

TABLE 22B

Path Conforming Profile ID = 1, 2 (Report Time 50 s)
Path Conforming Profile

PROFILE-ID = 1,
REPORT-DATA-SET = {RNP ...},
REPORT-TYPE = PERIODIC,
REPORT-TIME-PERIOD = 50 S,
REPORT-INTERVAL = 500 MS,
MAX-NONREPORT-INTERVAL = 5000,
CONTINGENT-ACTIONS = {LOST: IGNORE}

The Configuration message is shown in Table 23.

TABLE 23

Example of Path Conforming Configuration
Path Conforming Configuration

PCPS {PCP-1, PCP-2},
CONFIGURATION-LIST {
(ZONE-ID = 1, SEG-ID = 1, PCP-ID = 1),
(ZONE-ID = 1, SEG-ID = 2, PCP-ID = 2)}

A Cellular Network Resource Allocation may be requested and a USS may request the Network Resource. Upon receiving a Mission Planning Request from the UAS, the UTM system may inspect the message to determine presence of Network resource information element. If Network resource is present within the Mission Planning Request message, the information may be expressed as a tuple containing one or more of (but not limited to) the following metrics: committed bitrate, excess bitrate, packet loss rate, delay threshold, and jitter threshold.

The Network resource of Table 24 may be expressed as a tuple containing one or more of the above metrics per traffic type. For example, the UAS may include the network resources information element for two traffic types: an acknowledged mode traffic flow with corresponding tuple containing {Committed bitrate, Excess bitrate, Packet loss rate, Delay threshold, Jitter threshold} and an unacknowledged mode traffic flow with a corresponding tuple containing {Committed bitrate, Delay threshold} only.

TABLE 24

Mission Network Resource (e.g. Type 1)

Mission Network Resource (e.g.)
COMMITTED-RATE,
EXCESS-RATE,
PACKET-LOSS-RATE,
DELAY-THRESHOLD,
JITTER-THRESHOLD The UTM system may decide temporarily on the SOV and optimal 4D mission route for the mission requested by the UAS based on preferences and constraints contained in the Mission_Planning_Request. The optimal mission route $Q_k$ containing one or more segments may be temporarily held as a series of waypoints and paths.

The UTM system may decide on a per segment∈Qk basis the appropriate access node to involve. The relation between a segment $j \in Q_k$ and the possible set of access technologies may be configured at the UTM a priori. The set of access technologies may consist of one or more of but not limiting to the following: LTE, WCDMA R99, WCDMA HSPA, CDMA 1×RTT, CDMA HRPD, EDGE, GPRS, GSM, TETRA, Satellite, WiFi or other WLAN, etc.

The access node for a segment $j \in Q_k$ may be selected based on one or more of the following constraints: rate requirement indicated in the network resources information element, cost associated with reservation/network access of a particular access technology, availability of the particular access technology, power requirements on the UAS, time of mission operation during the day, access restrictions and cell barred status of access nodes surrounding mission operation time, and network loading.

To each access node selected for each segment $j \in Q_k$, the UTM system may send a Network Resource Request message containing the UAS identity in addition to one or more of the following categories of parameters.

A Mission Airspace Element may include a waypoint or a path. A Mission Time-Duration may be a start time of the mission with the time specified in one of {UTC, ISO 8601, RFC 3339} formats, an end time of the mission with the time specified in one of {UTC, ISO 8601, RFC 3339} formats, or include a delay tolerance on time and duration. A Mission Payload Resource may indicate the committed bitrate required on DL, the committed bitrate required on UL, the excess bitrate required on DL and/or the excess bitrate required on UL. Traffic types to support may include information on the transport protocol choice (e.g., TCP, UDP, SCTP, Raw IP). A mission priority may represent a power class of the UAS, maximum allowed packet loss rate or a maximum delay threshold contributable by the access network. A Mission UTM Resource may indicate a direct communication, for example, a sidelink resource or bitrate requirements (for PIBS, PIBS-RA). A Mission UTM Resource may also represent or indicate C2-link requirements, including: radio link monitoring and notification requirements, paging and UAS reachability requirement, path estimation and path reporting requirement, path estimation and path prediction requirement, a notification requirement on UAS entering network coverage, a notification requirement on UAS exiting network coverage, preceding access node information, succeeding access node information, or a paging rate from the UTM system.

The Command and Control (C2) data requirement may be necessary if a UAS is active on a mission. The resource requirement may be uniformly distributed if the airspace conditions are the same. The airspaces of different conditions, such as city or suburban areas, may require different C2-Data resources. On the other hand, payload data is location dependent and may be required at a mandatory waypoint where UAS application task to be performed.

The UAS Identity may be a temporarily unique or a globally unique identity. The UAS Identity may be a temporary identity or a permanent identity (e.g., IMSI or ICAO assigned Id). For security purposes, the UAS Identity may be obfuscated when transmitted in clear text and regenerated at the receiving access node. The regeneration may be by means of unscrambling, reverse looking up from a secure table or any suitable method.

Based on the mission parameters, the USS may send Network_Resource_Request messages to access network nodes along candidate waypoints and paths for mission route to be selected. If a waypoint or a path may be covered by multiple access nodes, the network resource required at the waypoint or path may be split in time or data rate. The Request message is illustrated in Table 25.

TABLE 25

Network Resource Request

```
Network Resource Request
MISSION-ID,
USS-ID,
UAS-ID,
AIRSPACES, /* waypoints and/or paths*/
TIME-DURATION,
C2-DATA,
PAYLOAD-DATA,
```

One access node may be able to provide network resources for multiple airspace elements (e.g., waypoints/paths/segments). Therefore, in one Request, the USS may aggregate the network resource requirements of multiple airspace elements to single access node (eNodeB).

The access node that receives the Network Resource Request may evaluate the reservation request to determine its capability to handle the segment. The access node may infer the way point set and the power class of the UAS to derive one or more of the following parameters: altitudes of the path in segment, open-loop transmit power expected at such altitudes covering the path in segment given a set operating point or known receive power level, a conservative estimate of SINR achievable for both DL and UL transmissions to and from the UAS at such altitudes covering the path in segment based on historic information or a reliable channel model, an estimate of power headroom on the UL based on expected open-loop transmit power and estimated UL SINR, the achievable spectral efficiencies based on above estimates, required spectral resources based on estimated spectral efficiencies and bitrate requirements requested by the UTM in the Network Resource Request message, and limits on out-going interference thresholds required to protect neighboring access nodes.

The access node that receives the Network Resource Request may also evaluate the spectral resource requirements for direct communications (e.g., Sidelink) requested for the UAS by the UTM system. The access node may at first determine the density of UASs as well as other devices that have reservation requests for direct communications overlapping the mission's start-end time. Alternatively, the access node may estimate the density of UASs as well as other devices that may require resources for direct communications overlapping the mission's start-end time. The access node may subsequently infer the way point set, the estimate of devices requiring direct communications resources and the power class of the UAS to derive one or more of the following parameters: altitudes of the path in segment, open-loop direct communications transmit power expected at such altitudes covering the strata in segment, a conservative estimate of SINR achievable for both DL and UL transmissions to and from the UAS to other UAS at such altitudes covering the path in segment based on historic information or a reliable channel model, an estimate of power headroom on the UL based on expected open-loop transmit power and estimated UL SINR, the achievable spectral efficiencies based on above estimates, required direct communication spectral resources based on estimated spectral efficiencies and bitrate requirements requested by the UTM in the Network Resource Request message, and limits on out-going interference thresholds required to protect neighboring access nodes.

The receiving access node may determine the serviceability of the requested UAS based on specified mission priority. It may estimate its ability to conform to latency requirements for the given UAS based on one or more of the following factors: already committed reservation requests equal to or higher than the UAS's mission priority covering the mission's start-end time, access node's scheduling capacity, and committed bitrates and spectral resources for already accepted reservation requests.

The receiving access node may determine, based on the UAS identity, the paging load that may be generated and the resources required for paging based on one or more of the paging rate required and the paging occasion/paging slot for the UAS.

The UTM system may repeat the above procedures with each access node it has decided for each segment $j \in Q_k$.

One or more segments $\in Q_k$ may be served by the same access technology. One or more segments $\in Q_k$ may be served by the same access node in the selected access technology. The segments $\in Q_k$ served by the same access node may or may not be consecutive though likely to be the case.

The UTM system may decide to request more than one access nodes with identical Network Resource Request queries at the same time. The UTM system may choose the best access node subsequently based on one or more of the following criteria: response time to the query, completeness of the response, nearness of the response to the request, reliability rating of the access node, and absence of a response from other access nodes.

The UTM system may update $Q_k$ after confirmation of resource reservation by the access nodes. The UTM system may also transmit the Network Resource Request message to the same access node at a subsequent time for the same mission. The subsequent request may either be treated as an update request for the mission for stated segment or a new request replacing the previous request in its entirety.

An Aggregated Network Resource Request may be used. In one embodiment, the USS may query network resource availability for given airspace based on statistics. That is, without asking network resource for a particular mission, it may gather the information about the network resource availability as a function of time. The information may be updated as the USS may periodically obtain the new statistics from related access nodes.

If the receiving access node is unable to guarantee the committed bitrate requirement in Network Resource Request, the receiving access node may respond with Network Resource Response indicating Failure. The receiving access node may infer the Network Resource Request to determine the flexibility of the mission to accept a mission partially or propose alternative mission parameters.

If the receiving access node is able to guarantee the committed bitrate requirement but is unable to fully accept other requested metrics (e.g., the excess bitrate requirement, direct communications requirement) contained in Network Resource Request, the receiving access node may respond with Network Resource Response indicating partial success. If a partial success is indicated, the access node may indicate the partial capacity it may be able to accommodate. For example, the access node may include the percentage of requested excess bitrate it may be able to accommodate.

If the receiving access node is able to guarantee all the requested criteria in Network Resource Request for a different time but not for the requested time, the receiving access node may respond with Network Resource Response indicating such capability along with the proposed time. The proposed time may be earlier than, later than or partially overlapping the originally requested time.

If the receiving access node is able to support only unacknowledged or only acknowledged mode traffic types, it may transmit the Network Resource Response indicating partial success along with supported control mode.

If the receiving access node is not equipped with algorithms to predict or track the path of the request mission, it may transmit the Network Resource Response indicating partial success along with any alternative proposals.

The receiving access node may optionally indicate in the Network Resource Response one or more of the parameters: average resource utilization ratio, peak resource utilization ratio, hardware configuration, processing capacity, admitted capacity, MTU size, maintenance schedule and downtime, histogram of spectral efficiencies as a function of time of day, and key performance indices and trend lines.

An Aggregated Network Resource Response may be used in a situation when the Request is querying the aggregated network resource availability for a given time. The receiving access node may only provide the statistical data on the resource availability based on, for example, the airspace location/position (with height) and time/day of week, which is returned to the requesting USS in the Response message. The USS may update the airspace element with a network resource attribute including eNodeB-IDs and aggregated resources available based on historical statistics.

If the UTM system is able to accept the fully successful or partially successful Network Resource Response, it may transmit a Network Resource Accept to the access node confirming the reservations for the segment requested. The Network Resource Accept may indicate acceptance of one or several segments in each message.

Radio resources may be provisioned during mission planning. If the requested waypoint/path are 5D, the UAS may get a returned mission route with radio resource provisioned between the USS and the mobile access network (eNodeB). Command and control link reliability may be indicated as an requirement.

A UAS x may send a Mission_Planning_Request to a USS y comprising: a 5D waypoint set P and/or a 5D path set V. For each waypoint or each path, the radio resource requirement may be a maximum probability of C2-link outage $p_c$, or the radio resource requirement is an average data rate r.

A USS y may periodically request radio access node (eNodeB) covering the waypoint or the path an average data rate R available for each UAS at average UAS operation density in a past period T.

A USS y collecting the C2-link outage instances may obtain a probability of C2-link outage $P_c$ at average UAS operation density in a past period T.

A UAS x may receive a Mission_Planning_Response from USS y comprising a 5D mission route with each waypoint and each path satisfying the probability of C2-link outage $P_c < p_c$, or the average data rate $R > r$, for all UASs operated in the waypoint or the path in the past period T.

The USS may send the mission route to the UAS just-in-time (JIT), meaning with only the detailed waypoints/paths for next segment before the UAS gets to the next segment. The USS may send a Radio_Resource_Request message to the radio access network for radio resource reservation before sending the JIT mission route. As the UAS may be close to the next segment, the duration of resource reservation may be specified. For example, the UAS for the mission may be reserved with an average data rate of 100 Kbps for the whole segment that is covered by an eNodeB.

A Radio Resource Reservation may be made in accordance with JIT Mission Route Planning. A UAS x, flying on a path $v_1$ of a mission route, may send a Mission_Update_Request message to a USS y comprising a required average data rate r for the subsequent path $v_2$ after path $v_1$ on the mission route. The path $v_2$ may have a starting time $t_s$ and an ending time $t_e$.

The USS y may send a Network_Resource_Request message to a cellular eNodeB covering the path $v_2$, comprising a radio resource reservation specification containing the UAS x's ID, the required average data rate r, and a required period $[t_s, t_e]$.

The USS y may receive a Network_Resource_Response message from the eNodeB comprising a radio resource reservation confirmation containing the UAS x's ID, uID, the granted average data rate $R > r$, and the granted period $[t_s', t_e'] \supseteq [t_s, t_e]$.

A UAS x may receive a Mission_Update_Response message from USS y comprising a radio resource reservation specification containing the UAS x's ID, uID, the granted average data rate $R > r$, and the granted period $[t_s', t_e'] \supseteq [t_s, t_e]$.

A UAS x connecting to an eNodeB when entering the path v2, may provide its uID. The UAS x may receive a radio resource with average data rate r for period $[t_s, t_e]$.

A Radio Resource Reservation may be mobility initiated. The USS may have the radio network coverage map for each eNodeB of a radio access network, and may be able to predict a handover of a UAS from current eNodeB to the next eNodeB. The USS may send a Radio_Resource_Request message to the radio access network with a mobility indication. The radio resource requirement and the duration may also be included. By the time the UAS moves to the coverage area by the next eNodeB, the resource may already be reserved.

A UAS x may be flying on a path v1 of a mission route, and may be covered by eNodeB c1. The next path may be v2, which may be covered by eNodeB c2.

A USS y managing the UAS x, may send a Network_Resource_Request message to the cellular eNodeB c2 covering the path v2 comprising a radio resource reservation specification containing UAS x's ID, uID, the required average data rate r, and the required period $[t_s, t_e]$.

The USS y may receive a Network_Resource_Response message from the eNodeB c2, comprising a radio resource reservation confirmation containing UAS x's ID, uID, the granted average data rate $R > r$, and the granted period $[t_s', t_e'] \supseteq [t_s, t_e]$.

The UAS x may connect to eNodeB c2 when entering the path v2, and may provide its ID. The UAS x may receive a radio resource with the average data rate r for period $[t_s, t_e]$.

If the UTM system is unwilling to accept the fully successful or partially successful Network Resource Response, it may transmit a Network Resource Cancel to the access node canceling the reservations for the segment requested. The UTM system may transmit the Network Resource Cancel message to an access node if the UTM system is unable to accept the Network Resource Response as proposed or if the UTM system deems a better Network Resource Response from another access node for the same Network Resource Request. The Network Resource Cancel may indicate cancellation for one or several segments in each message.

There may be overlaps between two managed airspaces $S_1 = (U_1, V_1)$ and $S_2 = (U_2, V_2)$, by USS-1 and USS-2, respectively. When a mission is planned on the overlapped part in the airspaces, the different USS may need to coordinate with each other via interface UTMX. When a USS (e.g. USS-1) receives a Mission_Planning_Request from a UAS for mission k, it may need to find a path $Q_k$ satisfying the requirement $P_k$. If $P_k$ partially goes into $S_2$, USS-1 may send an Airspace_Coordination_Request to USS-2. In the Request message, $Q_k'$, a subset of $Q_k$, including all overlapped segments, may be sent to USS-2.

For each Request message, USS-1 may receive an Airspace_Coordination_Confirm that includes current plans on the overlapped segments. The USS-1 may find an available 3D slot in each overlapped segments that may meet the time constraints. The overlapped airspace segments may have a coordination USS assigned at the time of USS registration or update.

The Airspace_Coordination_Request may only be sent to the coordinator for the airspace segments in $Q_k'$. Only one primary USS may be assigned to an airspace (e.g., all airspace segments may be assigned to the same primary USS as coordinator). The USS-1 may receive an Airspace_Coordination_Confirm from each primary USS, with the assigned 3D slot for airspace segments in $Q_k'$, coordinated by the USS. Once the mission plan path $Q_k$ is determined, the USS-1 may send a Mission_Planning_Response to the UAS operator who made the request.

A "CERTIFICATE" in a registration message may refer to the certificate of the entity who submits the request. A "UTM-CERTIFICATE" may refer to a certificate issued by UTM registration system to a UTM entity. A "USS-CERTIFICATE" may refer to a certificate issued by a USS to a service subscriber.

Primitives of USS registration to a centralized UTM registration sub-system may be required in order to support coexistence of multiple USSs, especially over the same airspace.

The API of the UTM registration sub-system may be publicly available to any one that intends to offer a USS service. The USS service program at the USS server may send a UTM_Registration_Request to the UTM registration sub-system. The Request may include a USS-Name and a Certificate issued by a third-party CA which indicates the USS is capable to provide a set of Services, and to manage a set of Airspaces. The Services may include supplemental services, such as weather, terrain, map, etc.

A USS may go through a process of gaining the certifications for providing certain UTM related services at a given set of airspaces. The UTM registration sub-system may need to verify the identity and the capabilities of the USS via a third-party certificate authority (CA). If the CA is well known and the UTM registration sub-system already trusts its public key, the UTM registration sub-system may be able to verify the certificates of the USS locally. Otherwise, a verification inquiry may be sent to the CA to request the certificate of the CA.

The services provided and the airspaces by a USS may be certified via different CAs, and the UTM registration sub-system may need to send multiple verification inquiries.

TABLE 26

| USS Registration Request |
| --- |
| USS Registration Request<br>USS-Name,<br>Certificate,<br>Services,<br>AIRSPACES |

After the certificate verification, the UTM registration sub-system may decide what services and airspaces are granted to the USS. The decision may involve business and regulatory aspects. For example, even if a USS A may be capable to manage the airspace of NYC, the UTM registration sub-system may want to grant only the airspace to a USS provided by NYC municipal.

A USS Registration Response is shown in Table 27A and Table 27B. The USS server x may receive a USS_Registration_Response from the UTM registration system. The Response may include the ussID$_x$ and a certificate with signed fields of the available USS services and a set of granted airspaces $\{S_{x,k}\}$ for management (maybe a subset of original requested). The certificate may indicate a coordinate airspace $S_{x,k}$ is coordinated by the USS-x.

TABLE 27A

| USS Registration Response |
| --- |
| USS Registration Response<br>USS-ID,<br>UTM-CERTIFICATE,<br>SERVICES,<br>MANAGE-AIRSPACES,<br>STATUS = SUCCESS |

If the UTM registration sub-system cannot verify the USS's certificate or approve its requested service set and/or airspace set, a Response with a status=Failure may be sent back to the USS. Even if service set and airspace set is partially granted, a Response with a status=Success may be sent back. However, the SERVICES and AIRSPACES in the response may be subsets of what was sent in the Request. The airspace management service (AMS) may be within the granted service set or the USS_Registration_Request may fail.

TABLE 27B

| USS Registration Response |
| --- |
| USS Registration Response<br>USS-NAME,<br>STATUS = FAILURE,<br>CAUSE = (CERTIFICATE VOID / CAPABILITY DENY) |

A USS server x may send a USS_Registration_Update to the UTM registration system with ussID$_x$ and an updated set of available USS services and managed/coordinated airspace. In response, it may receive a USS_Registration_Response with the granted updated set.

A UAS operator must be registered to a centralized UTM registration system to validate its credentials to use the UTM system. The registration may be done via the USS it subscribes to. For example, a UAS Operator may first subscribe to a USS and then register to UTM system via a service provided by the USS.

A UAS operator y may send a UASOperator_Registration_Request to the UTM registration system with its ID, a certificate issued by a certificate authority (CA) to verify the authentication and authorization, and an operation airspace $S_y=(U_y, V_y)$. The airspace $S_y$ may be defined by a 3D geographic region, or 4D region with a time constraint.

TABLE 28

| UASOperator Registration Request |
| --- |
| UASOperator Registration Request<br>UASOPERATOR-NAME,<br>CERTIFICATE,<br>OPERATION-AIRSPACES |

An exemplary UASOperator Registration Response message is shown in Table 29A and Table 29B. The UAS operator may receive a UASoperator_Registration_Response from the UTM registration system with a system wide unique ID, and a signed certificate with approved operation airspaces {S}, which may be a subset of original requested airspaces. A set of available USSs may be included. The set of available USSs may share the responsibility to manage the operation airspace.

The Response may return with a status=Failure if the UTM registration sub-system fails to verify the certificate and/or deny the operation airspaces.

TABLE 29A

UAS Operator Registration Response Success

UASOperator Registration Response
UASOPERATOR-ID,
UTM-CERTIFICATE,
OPERATION-AIRSPACES,
USS-SET,
STATUS = SUCCESS

TABLE 29B

UAS Operator Registration Response Failure

UASOperator Registration Response
UASOPERATOR-NAME,
STATUS = FAILURE,
CAUSE (CERTIFICATE VOID / CAPABILITY DENY)

In response to the UASOperator_Registration_Response, a UAS operator may send a UASOperator_Registration_Confirm to confirm the granted operation airspace set.

A UAS operator y may send a UASoperator_Registration_Update to the UTM registration system with the opID$_y$, an updated certificate issued by a CA, and an updated operation airspace set {S$_y$}. The UAS operator may receive a UASoperator_Registration_Response with an approved operation airspace.

A UAS may need to register to the UTM registration sub-system before planning or executing a mission managed by the UTM system. The registration may be conducted via a UAS operator.

A UAS x may register to the UTM registration system before executing a mission managed by the UTM system. The registration may be conducted via the UAS operator y or the USS z it subscribes to. For example, a UAS may first subscribe a UAS operator service or a USS service before registering to the UTM registration system.

A UAS operator y or a USS z may send a UAS_Registration_Request to the UTM registration system. Within the Request, the UAS operator ID, the UAS ID (VIN) and a certificate of the UAS x may be provided. The Request must be signed by UAS operator y or USS z if it is made indirectly via either entity.

A manufacturer of a UAS may get a certificate for the UAS x from a C) after the UAS is verified that it has gone through a testing and certification process on both its hardware and software platforms.

TABLE 30

UAS Registration Request

UAS Registration Request
UAS-ID,
UASOPERATOR-ID,

TABLE 30-continued

UAS Registration Request

UAS-CERTIFICATE,
OPERATION-AIRSPACES

The UTM registration system may send a UAS_Verification_Request to the CA that may verify the UAS x's certificate indicating it has passed the testing and certification process.

If the verification is successful, the UTM registration sub-system may receive a UAS_Verification_Response with a success. It may send a UAS_Registration_Response to the UAS with a UTM certificate bundling the UAS's VIN, the UAS operator ID, and a granted operation airspace. The corresponding public key of the UTM certificate may be used as a non-spoofing UAS identity under the UTM system.

TABLE 31A

UAS Registration Response Success

UAS Registration Response
UAS-ID,
UTM-CERTIFICATE,
OPERATION-AIRSPACES,
STATUS = SUCCESS

TABLE 31B

UAS Registration Response Failure

UAS Registration Response
UAS-ID,
STATUS = FAILURE,
CAUSE (CERTIFICATE VOID / CAPABILITY DENY)

A UAS may be self-operation-capable and may be able to directly register to the UTM registration system without an explicit UAS operator. From the regulator point of view, a UAS operator may have more qualification requirements than a UAS (e.g., better insurance coverage). Therefore, the UTM system may require a UAS being operated under a registered UAS operator. However, if a UAS may meet the regulatory requirements to operate without a registered UAS operator, the UAS may be referred to as a self-operation-capable UAS. In the UAS_Registration_Request, a default ID for self-operation may be set in the UAS operator ID field. The UAS's certificate may show the UAS is a certified self-operation-capable, that is, it may be managed by the UTM system without a registered UAS operator.

A self-operation-capable UAS may choose to be registered to and managed by the UTM system via a UAS operator. For example, a self-operation-capable UAS may also be a member of a fleet operated by a registered UAS operator.

A UAS Registration Request may be sent to a Foreign UTM in the case of roaming. Assuming the network address of the foreign UTM registration sub-system is provided, a UAS may send a UAS_Registration_Request to it with a UTM-certificate issued by its home UTM registration sub-system. Same as home UTM registration, the UAS-VIN, UASoperator-ID and an intended operation airspace set are included in the message.

TABLE 32

UAS Roaming Registration Request

UAS Roaming Registration Request
UAS-ID,
UASOPERATOR-ID,
HOME-UTM-CERTIFICATE,
OPERATION-AIRSPACES The home UTM system information may be provided in the UTM-certificate. If the foreign UTM system has a roaming agreement with the home UTM system, the foreign UTM registration sub-system may send an inquiry to the home UTM registration sub-system to verify the UAS registration status like a process for roaming users in mobile networks.

If the UAS is verified with a valid certificate and the right capability to be operated under the foreign UTM system, a UAS_Registration_Response with a success may be sent back to the UAS. A foreign UTM issued UTM certificate may be included with the granted operation airspaces set as a signed attribute.

TABLE 33A

UAS Roaming Registration Response Success

UAS Registration Response
UAS-ID,
FOREIGN-UTM-CERTIFICATE,
OPERATION-AIRSPACES,
STATUS = SUCCESS The UAS may receive a Response with status=Failure, if the home registration status verification process fails.

TABLE 33B

UAS Roaming Registration Response Failure

UAS Registration Response
UAS-ID,
STATUS = FAILURE,
CAUSE (CERTIFICATE VOID / CAPABILITY DENY)

A USS directory service may be provided with a publish/subscribe interface. The UTM registration sub-system may manage a USS Directory Service that publishes the available USSs for each airspace. Any UTM entity (e.g., a USS, a UAS operator, or a UAS) intended to operate under a given airspace may query the UTM registration sub-system for a list of available USSs sharing the responsibility of managing the airspace. Each USS is published with a service descriptor as shown in Table 34.

TABLE 34

USS Service Descriptor

USS Service Descriptor
USS-ID,
UTM-CERTIFICATE,
SERVICES (W/ADDR).
OPERATION-AIRSPACES,
COORDINATION-AIRSPACES A USS may already be registered under UTM registration sub-system. Each USS may have a UTM-Certificate that may sign the qualified services to offer and granted operation airspaces. Each airspace may be shared by multiple USSs but only one USS may be assigned as the coordinator. In the USS service descriptor, the coordination airspaces may be those a USS is in charge as a coordinator. A UTM entity may periodically query the USS directory service to get an update on available USS service list. A UTM entity may subscribe to the USS Directory Service for given airspaces so that it gets an on-demand update whenever there is a new change on the available USS in the corresponding airspaces. A registered USS may choose to perform a self-announcement on the services it provides to UTM entities (e.g., UASs, UAS operators, or other USSs) in a geographical area. A USS_Service_Announce message may be sent over a broadcast/multicast media at the geographic region of a managing airspace. The Announce message may include the data of a USS service descriptor as shown in Table 35.

TABLE 35

USS Service Self-Announcement

USS Service Self-Announcement
USS-ID,
UTM-CERTIFICATE,
SERVICES,
MANAGE-AIRSPACES,
COORDINATE-AIRSPACES A USS may provide the airspace management (ASM) service, proxy service for air navigation service provider (ANSP) and flight information management system (FIMS), and supplemental services, such as weather, terrain map and airspace context services. At a given airspace, a UAS operation may be managed under only ASM service provided by a USS. The ANSP/FIMS proxy and supplemental services may be provided by same or different USSs. The system design described herein may refer to a primary on the ASM service.

The USS server may receive a USS_Subscribe_Request from a UAS operator. Within the request, the UAS operator ID may be provided. A USS may provide multiple services. In the Request, an intended service set to be subscribed may be provided. The intended operation airspaces may be provided as well. The UAS operator may also provide a fleet of UASs it operates.

TABLE 36

USS Service Subscribe Request from UAS Operator

USS Service Subscribe Request
UASOPERATOR-ID,
UTM-CERTIFICATE,
SERVICE-SET,
OPERATION-AIRSPACE,
UAS-FLEET The USS server may verify the UAS operator UTM certificate to ensure it is a registered UTM entity. The verification may be done locally if the full UTM certificate for the UAS operator is included in the Request. The UTM certificate may include authorization and constraints for the UAS operator, which may lead to USS's decision on granting the intended USS services and operation airspaces. For example, the USS may provide a true identity service that may report all UAS's VINs in a given airspace, which may be only available to a UAS operator for police drones.

The UTM server may send a Service_Subscribe_Response to the UAS operator. Within the Response, an available USS service set may be provided with dynamic configuration. For example, a supplemental service address (URL) may be given based on the location and the load of service demands. A certificate that authorizes the USS to use the USS service set may be given.

TABLE 37A

USS Service Subscribe Response to UAS Operator Success

USS Service Subscribe Response
UASOPERATOR-ID,
USS-CERTIFICATE,
SERVICES,
OPERATION-AIRSPACE,
STATUS = SUCCESS

TABLE 37B

USS Service Subscribe Response to UAS Operator Failure

USS Service Subscribe Response
UASOPERATOR-ID,
STATUS = FAILURE,
CAUSE (CERTIFICATE VOID/CAPABILITY DENY)

The UAS operator may establish a SSL/TLS or IPsec session to each granted USS service over the UTM2 interface and starts to communicate with the USS services. The session may be set asynchronously via, for example, a RESTful API or websocket API. The UAS operator may update its requirements on service set and operation airspace via this session.

The UAS operator may send a USS_Service_Un-Subscribe_Request message to a USS server when it stops to use any of the services from the USS. The Request may include the UAS operator ID signed by the private key of either UTM or USS issued certificate, which may verify the integrity of the Request.

The USS server may receive a USS_Subscribe_Request from a UAS. Within the request, the UAS ID (i.e., VIN) may be provided. The UAS operator ID for the UAS may also be provided. In addition, an intended service set to be subscribed and intended operation airspaces may be provided as well.

TABLE 38

USS Service Subscribe Request from UAS

USS Service Subscribe Request
UAS-ID,
UASOPERATOR-ID,
UTM-CERTIFICATE,
SERVICE-SET,
OPERATION-AIRSPACES The USS server may verify the UAS UTM certificate to ensure it is a registered UTM entity. The verification may be done locally if the full UTM certificate for the UAS is included in the Request. The UTM certificate may include authorization and constraints for the UAS, which may lead to USS's decision on granting the intended USS services and operation airspaces. For example, the USS may provide a true identity service that may report all UAS's VINs in a given airspace, which may be only available to a police drones.

The USS server may be able to verify the UAS's authentication and authorization status already if the UAS is a member of the fleet of a subscribed UAS operator.

The UTM server may send a Service_Subscribe_Response to the UAS. Within the Response, an available USS service set may be provided with dynamic configuration. For example, a supplemental service address (URL) may be given based on the location and the load of service demands. A certificate that authorizes the USS to use the USS service set may be given.

TABLE 39A

USS Service Subscribe Response to UAS Success

USS Service Subscribe Response
UAS-ID,
USS-CERTIFICATE,
SERVICES,
OPERATION-AIRSPACES,
STATUS = SUCCESS

TABLE 39B

USS Service Subscribe Response to UAS Failure

USS Service Subscribe Response
UAS-ID,
STATUS = FAILURE,
CAUSE (CERTIFICATE VOID/CAPABILITY DENY)

A UAS subscribed to a USS may establish a SSL/TLS or IPsec session to each granted USS service over the UTM1 interface and may start to communicate with the USS services. The session may be set asynchronously via, for example, a RESTful API or websocket API. The command and control (C2) may be a link between a UAS and a USS for USS service session.

The UAS may update its requirements on service set and operation airspace via this session. A USS-subscribed UAS may send a USS_Service_Un-Subscribe_Request message to a USS server when it stops to use all services from the USS. The Request may include the UAS ID signed by the private key of either UTM or USS issued certificate, which may verify the integrity of the Request.

A UAS may subscribe to one or more supplemental USS services, such as weather information or terrain maps, from a different USS from the one providing the ASM service. A UAS may select a best fit USS from multiple available USSs in the airspace it intends to operate. The RNP requirement, airspace capacity, and radio resource capability may be used as the criteria for the election.

A UAS may subscribe to a USS service. A UAS x may receive USS publishing information from multiple USSs, each comprising a USS ID y and a service set with service descriptors, including one or more of: a service ID, a service description, a managed airspace set with parameters (e.g., airspace ID and/or zip code), USS ID of the airspace coordinator, maximum required navigation performance (RNP), airspace capacity, airspace capacity being an indicator, radio network capacity, and radio network capacity.

The UAS x may check if a USS y on its preferred list, managing the airspaces it needs, and providing services it needs. The UAS x may further check if USS y's maximum RNP is greater than its capable RNP. The UAS x may further check if USS y indicates that tis airspace capacity and radio network capacity are not full (e.g., below a threshold).

The UAS x may send a USS_Service_Subscribe_Request message to USS y if all checks are passed comprising: the UAS ID, the UTM certificate issued by UTM registration system, service set to be subscribed to, and airspace set to operate.

If multiple USSs are positive for subscription, the UAS x may send a USS-Service_Subscribe_Request to a USS y if it is the coordinating USS for an airspace it is currently operating, or it has the maximum RNP, maximum airspace capacity, and/or maximum radio network capacity.

The UAS x may receive a USS_Service_Subscribe_Response from USS y comprising: an approved operation airspace list with attributes including the maximum-RNP, airspace capacity and radio resource capacity, and a service list with access addresses (URLs).

The UAS x may set up a service connection to each USS service using the corresponding server address (URL). A USS may announce its service in an airspace with a coordinator indicator. A UAS may choose to subscribe to a coordinator in order to have a better quality of service (e.g., lower latency on mission route creation and modification during mission planning and execution).

The UAS x may receive a USS_Service_Publishing message from USS y over a broadcasting media. The message may comprise an airspace management coordination flag O indicating if USS y is the coordinator (i.e., primary USS) of the airspace where the broadcasting is made. The UAS x may send a USS_Service_Subcribe message to the USS y if the flag is on (i.e., O=1).

An airspace may be shared by multiple USSs. Only one USS may be assigned as a coordinator for airspace management (ASM) service. If a UTM registered USS has an operation airspace coordinated by another USS, it may need to subscribe to the coordination service of that USS. Two USSs may establish an ASM service coordination session over the UTMX interface.

A USS may select a 4D Mission Route. A USS z may receive a Mission_Planning_Request for mission k from either a UAS x or a UAS operator y. The USS z may start a mission planning procedure that includes selecting Mission Routes per the requirements of $P_k$, UAS Capability, and Mission Attributes in the Request, and forming a Mission_Planning_Response message including $Q_k$. The USS z may then send the message back to UAS x or UAS operator y.

A route may be a set of waypoints and paths that meets the requirements in the Mission_Planning_Request. A route may be optimal if the total cost at all waypoints and paths is minimized. The cost of a waypoint or path may be defined by, for example, the time spent, the distance traveled, or the work (energy) consumed. A 4D Mission Route Selection may include one or more of the following steps.

A determination of a safe operation volume (SOV) may be needed for the UAS x to operate safely. The SOV may be a 3D tube with a length Ls and a radius Rs. The length may include the headway and the tail space a UAS needs at a given speed. The radius may specify the side space a UAS needs at a given speed and under a given context.

The Ls for UAS x may be derived be derived from its VIN (uVINx). Ls may be a function of cruise speed. The faster the UAS x is traveling, the bigger the Ls may be needed. The cruise speed for a zone, segment, or path may be predetermined, and the Ls may be a fixed value.

The Rs may be derived using the RNP Capability Value. If $L_s=RNP_k$, the UAS x may be able to remain inside the SOV at 95% confidence level. If $L_s=2*RNP_k$, the UAS x may be able to remain inside the SOV at 99.999% confident level.

The SOV may be derived from the DAA Capability Value. If the UAS x is capable of running DAA, the $L_s$ and Rs may be derived from the DAA separation volumes. With DAA, the SOV radius may be between $RNP_k$ and $2*RNP_k$, i.e., $RNP_k<Rs<2*RNP_k$.

Waypoints may be matched. The waypoint set $P_k$ in a Request may contain waypoints that are the same as one or more waypoints in an USS airspace model, waypoints that overlap with one or more waypoints in the USS airspace model but have different center and shape, and/or waypoints that do not overlap with one or more waypoints in the USS airspace model. For the second case, the USS may use the overlapped waypoint. For the third case, the USS may create a new waypoint in its airspace model if it is in the legitimate flying area. If a waypoint from the Request blocks an existing path of the airspace model the USS manages, the USS may break a path into two by adding a waypoint in between. The restriction on waypoints may be applied to an airspace model for many reasons such as, for example, a geo-fencing area, a spot with high probability of wind gust, a spot with high probability of people gatherings, etc.

Airspace Segment Attributes may be checked. For a given airspace zone $S_n=(U_n, V_n)$, the USS may pre-select a subset of the zone $S'_n$, in which the attributes of waypoints and paths in all segments meet the UAS Capacity and Mission Attributes in the Mission Planning Request. The following airspace attributes may be checked to pre-select airspace segments into $S_n$.

Given the SOV, a segment $s_{i,j}$ may be pre-selected to $S'_n$, if the volume of path $v_{i,j}$ and the volume of waypoints $u_i$, $u_j$, are greater than SOV. The SOV's radius $R_s$ may be less than path's radius $w_{i,j}$ and the waypoint's radius $r_i$, $r_j$.

If the segment RNP is larger than the RNP capability of the UAS for the mission, the segment may be pre-selected to $S'_n$. A segment in an airspace zone may be DAA capable if all waypoints and paths in the segment are labeled DAA capable by USS. The waypoints and pats in the segment may be labeled DAA capable for many reasons such as, for example, weather conditions, terrain conditions, and edge resource capability. If a segment is not DAA capable, the SOV may be larger since DAA may not be considered in determining SOV size.

If a segment's sharability level X is less than the Sharability Level in Mission Attributes in the Request message, the USS may exclude a path $v_{i,j}$ from $S_n'$, A segment in an airspace zone may be specified by the USS with a sharability level X based on many reasons, including path prioritization, weather conditions, geo-fencing, and privacy.

The USS may pre-select a segment $s_{i,j}$ with a delay variance Ds in real-time operations if Ds is less than the Delay Tolerance Value specified in Mission Attributes in the Request. The delay variance of a segment $s_{i,j}$ may be obtained from the statistics of historical operation.

The USS may pre-select a segment $s_{i,j}$ met the priority of the Mission Type specified in the Request. For example, a shortcut segment may be allowed for a police UAS but normally prohibited for non-emergency UAS.

A 4D Route for a Mission may be selected. The USS may need to find one or more 4D routes over the pre-selected subset $S'_n=(U_n, V_n)$ in the managed zone $S_n$, which may contain the airspace segments meet the requirements of $P_k$.

A 4D Route may be qualified. A 4D route $Q_k=\{S_{i,j,k}, t_{i,j}\}$ may be qualified as a route for the mission if $P_k$ satisfies the following requirements. Every waypoint $u_{i,k}$ in $P_k$ may be a waypoint in a segment $s_{i,j,k}$. The visit time $tv_{i,k}$ and the period $td_{i,k}$ of waypoints $u_{i,k}$ in $P_k$ may satisfy the ending time of incoming path $t_{s,i,k}<tv_{i,k}$ and the starting time of outgoing path $ts_{i,j,k} \leq tv_{i,k}+td_{i,k}$.

A Capability Check may be performed on a 4D Available Airspace. An airspace segment $s_{i,j,k}$, may be selected as a valid segment in $Q_k$ if the capacity of each path in the segment may accommodate the UAS selected for all missions for any given time (i.e., the total separation volumes of the flights in the segment may not exceed the overall capacity).

A 4D Path Capacity Check may be expressed as:

$$\Sigma_k SOV_k * \text{step}(te_{i,j,k} - ts_{i,j,k}) \leq |v_{i,j}|.\qquad\text{Equation (1)}$$

Equation 1 may hold for any time $\min(ts_{i,j,k}) \leq t \leq \max(te_{i,j,k})$. The details of the route assignment may introduce more constraints. For example, each segment may contain multiple lanes and each lane may be used for the UAS's flight at the same cruise speed. The cruise speed may determine the throughput of a lane, which may put further constraints on $ts_{i,j,k}$ and $te_{i,j,k}$. Assuming the cruise speed is Sm and the segment length is $D_m$, then:

$$te_{i,j,k} = ts_{i,j,k} + D_m/S_m.\qquad\text{Equation (2)}$$

$SOV_k$ may be the safe operation volume of the UAS of mission k. It may depend on the cruise speed of the segment selected. For maximum capacity utilization, the USS may assign a cruise speed that is as fast as possible, but less and/or equal to the optimal speed that gives the maximum throughput for any given lane in a segment. The cruise speed may be limited by the maximum speed of the slowest UAS.

If a waypoint also has a capacity constraint, the total number of UASs in the waypoint at any given time may be less than the capacity of the waypoint.

A 4D Waypoint Capacity Check may be expressed as:

$$\Sigma_k SOV_k * \text{step}(te_{j,i,k} - ts_{i,l,k}) \leq |u_i|\qquad\text{Equation (3)}$$

For mission k, at a waypoint i, the duration the UAS is in the waypoint may be from $te_{j,i,k}$, the end time of the incoming path $v_{j,i}$, to $ts_{i,l,k}$, the start time of the outgoing path $v_{i,l}$. The condition of Equation 2 and Equation 3 may be satisfied for every airspace segment $s_{i,j,k}$ in $S_n'$.

TABLE 40

4D Mission Segment

| 4D Mission Segment |
|---|
| SEGMENT-ID, |
| MISSION-ID, |
| WAYPOINTS, /* 4D */ |
| PATHS, /* 4D */ |
| SAFE-OPER-VOLUME, |
| AIRSPACE-ATTRIBUTES |

TABLE 41

4D Mission Route

| 4D Mission Route |
|---|
| ROUTE-ID, |
| MISSION-ID, |
| SEGMENTS, /* 4D */ |
| SAFE-OPER-VOLUME, |
| AIRSPACE-ATTRIBUTES |

Airspace Capacity may be shared with Multiple USSs. An airspace may be managed by multiple USSs. Although the volume of the airspace may be the same, the capacity allowed to each USS may only be a portion of total capacity. A USS z may only get a portion of capacity for waypoints and paths in one or more airspace zones related to the mission k. In Equation 1 and Equation 3, $|v_{i,j}|$ and $|u_i|$ may represent only a portion of capacity of the airspace volume managed by USS z. A UAS x or a UAS operator y may only subscribe to one USS for a given airspace zone and for a given mission.

Table 40 contains a sequence of 4D mission segments $\{s_{i,j}\}$. Since there may be multiple qualified routes for a mission, a mission route may be given a unique ID under the mission. The safe operation volume (SOV) may indicate the spatial resource the mission needs, which may be a function of time, speed, weather and other conditions. An overall airspace attribute set is given for default values. Unless a lower hierarchy airspace element has a different airspace attribute, a default value may be used.

Each 4D mission segment $s_{i,j}$ may have multiple 4D paths and 4D waypoints that meet the requirement of $P_k$ in the Mission_Planning_Request.

A unique ID may be given to a mission segment to differentiate the overlapping segment with different paths but same starting and ending waypoints. A mission segment may be referred to using an index number uniquely under the mission route $Q_k$ it belongs to. Index 0 may represent a special segment, that is, the zone it belongs to, with all waypoints and paths in the zone.

A mission segment may be used to group a set of waypoints and paths that have the same airspace attributes for a given mission k. The mission segment may be specific to a mission route and may not be used independently for other mission routes.

A USS may select a 5D Mission Route. For a managed airspace, a USS may identify the available network access nodes (e.g., eNodeBs) and may record the network resource availability. The USS may check the network resource availability via a Network Resource Request Process described above. The process may include one or more of the following steps.

Resource availability may be checked by requesting the total resource availability of each network access node for a given period. The availability may be presented as a provisional value based on statistics or a deterministic value based on real-time prediction for UTM service and/or UAS applications. A returned value may be stored as the available-resources in the corresponding access node record.

Access nodes may be mapped to airspace elements based on a serviceability measurement. A best set of access nodes may be chosen for each airspace element. Corresponding eNodeB-IDs may be stored as the network resources for the airspace elements.

A network resource may be reserved for a mission. For a given mission route, the network resource requirement at each airspace element on the route may be linked to the one access node record as either C2-reservation and/or App-reservation entries. The network resource requirement at an airspace may be split in to multiple portions and linked to multiple access node records.

A USS may receive coarse estimates of available resources based on statistical data. It may link the resource reservations to the access node but may not actually send a resource reservation to the access node in real-time for a given mission. The USS may send a network resource request to an access node to reserve the network resources for a given mission in real-time as mission is planning.

TABLE 42

Network Access Node (eNodeB)

| Network Access Node |
|---|
| ENODEB-ID, |
| AVAILABLE-RESOURCES, |
| C2-RESERVATIONS, |
| APP-RESERVATIONS |

A 5D Route may be selected for a Mission. A USS z may check the network resource availability at every airspace segment $s_{i,j,k}$ in the pre-selected airspace segment set $S'_n$. The network resource availability may be time-varying, for example, the capacity may be less at the peak hour for UTM and UAS applications. A mission requiring big data payload for video surveillance may need to be executed in early morning.

A 5D Route may be qualified. The USS determines the network resource $R_{i,j,k}$ granted for the UAS at each airspace segment $s_{i,j,k}$.

$$Q_k = \{s_{i,j,k}, (ts_{i,j,k}, te_{i,j,k}), R_{i,j,k}\}. \quad \text{Equation (4)}$$

In general, the network resource $R_{i,j,k} = (r_{i,k}, r_{(i,j),k}, r_{j,k})$ may include the resource granted for waypoint $u_{i,k}$, path $v_{i,j,k}$ and waypoint $u_{j,k}$, respectively. The granted resource for each waypoint may satisfy the resource required in waypoint set $P_k$ in Mission Planning Request.

The network resource may be measured as a combination of one or more, but not limited to, the following metrics: average data rate, peak data rate, delay constraint, packet loss rate, and priority. As an example, $r_{i,k}$ may be defined as a function of a tuple $(R_{ave}, P_{eak}, T_d)_{i,k}$ at a waypoint $u_i$, containing an average data rate, a peak data rate, and a delay value. The UTM command and control (C2) function may require a resource allocation with a low $T_d$ and a low $R_{ave}/P_{eak}$, whereas a video survey application may need a resource allocation with a high $R_{ave}/P_{eak}$ but relaxed $T_d$.

Network capacity may be checked. Assuming the total network resource at a waypoint $u_i$ is $r_i = ((R_{ave})_i, (P_{eak})_i, (T_d)_i)$, and on a path $v_{i,j}$ is $r_{i,j} = ((R_{ave})_{i,j}, (P_{eak})_{i,j}, (Td)_{i,j})$, the following equations may be satisfied for waypoints:

$$\Sigma_k (R_{ave})_{i,k} * \text{step}(te_{j,i,k} - ts_{i,l,k}) \leq (R_{ave})_i, \text{ and}$$

$$\Sigma_k (P_{eak})_{i,k} * \text{step}(te_{j,i,k} - ts_{i,l,k}) \leq (P_{eak})_i, \text{ and}$$

$$(T_d)_i < (T_d)_{l,k} \text{ for all } i, \quad \text{Equation (5)}$$

And for paths $$\Sigma_k (R_{ave})_{i,j,k} * \text{step}(te_{i,j,k} - ts_{i,j,k}) \leq (R_{ave})_{i,j}, \text{ and}$$

$$\Sigma_k (P_{eak})_{i,j,k} * \text{step}(te_{i,j,k} - ts_{i,j,k}) < (P_{eak})_i, \text{ and}$$

$$(T_d)_{i,j,k} < (T_d)_{i,j} \text{ for all } (i,j). \quad \text{Equation (6)}$$

The sum of all allocated network resource at any given waypoint or path for all missions may not exceed the total capacity offered by the network operator at a given time and the waypoint and path locations. That is, both the average data rate and peak data rate may not be more than the network capacity. The delay guarantee may be less than the required value for every waypoint in $P_k$.

Table 43 shows a 5D mission route, which may be different from the 4D mission route in that it contains a sequence of 5D mission segments as shown in Table 44. The 5D mission route may also include a route level network resource as the default value for all segments in the route.

TABLE 43

5D Mission Route

| 5D Mission Route |
|---|
| ROUTE-ID, |
| MISSION-ID, |
| MISSION-SEGMENTS, /* 5D */ |
| NETWORK-RESOURCE, |
| SAFE-OPER-VOLUME, |
| AIRSPACE-ATTRIBUTES |

TABLE 44

5D Mission Segment

| 5D Mission Segment |
|---|
| ID, |
| ZONE-ID, |
| MISSION-WAYPOINTS, /* 4D */ |
| MISSION-PATHS, /* 4D */ |
| SAFE-OPER-VOLUME, |
| NETWORK-RESOURCE, /* $5^{th}$ D*/ |
| AIRSPACE-ATTRIBUTES |

The 5D mission segment may contain 5D waypoints and paths. The 5D mission segment may add a segment level network resource as the default value for the network resource in 5D waypoints and paths.

Figure 13:
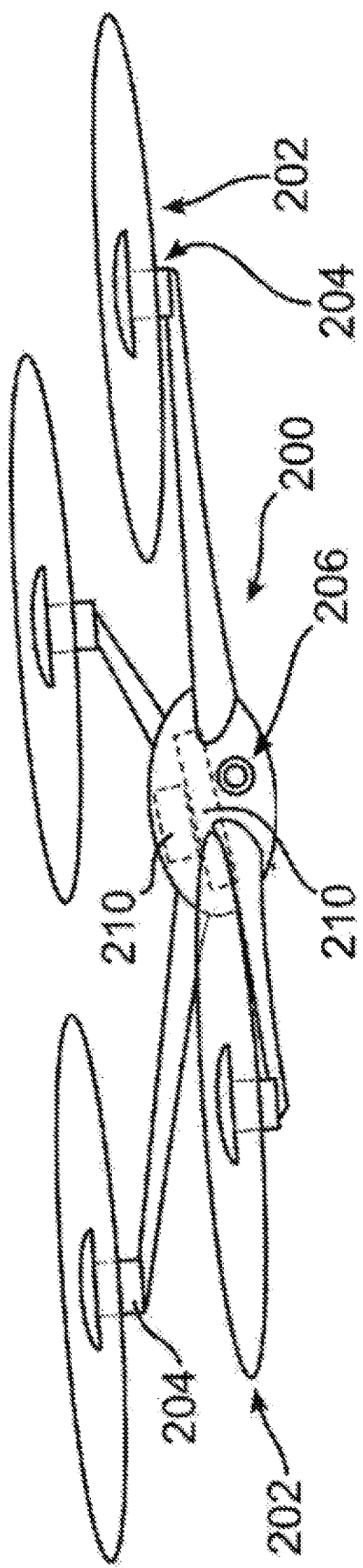
FIG. 13 is a diagram of an example UAS.

Referring now to FIG. 13, a diagram illustrating an example UAS 200 that may be used in a UTM system. The UAS 200 may be any type of conventional aerial vehicle that has the ability to fly without a pilot, The UAS 200 may be a fixed wing drone, a multi-rotor drone, a single-rotor drone, an inflatable drone or a hybrid drone. The UAS 200 is illustrated as a four propeller drone, but any drone configuration that can fly within an anticipated area of deployment can be used. The UAS 200 may have an electronic processing circuit configured to execute machine instructions to carry out the tasks described herein. The UAS 200 may communicate with a UTM and/or other UASs wirelessly during flight, for example using a short or long range wireless communication protocol, examples including WiFi, WiMAX, BLUETOOTH, SIGFOX, 3G, 4G, LTE, or another protocol, for example using a publicly available frequency.

The UAS 200 may have varying amounts of processing capability, but includes at least sufficient processing capacity to fly, and further includes the components normally associated with a UAV, such as a means of propulsion, for example one or more propellers 202 driven by a motor 204, a power source 134, one or more cameras 206, and a control circuit 210. The control circuit 210 may include flight related sensors, electronics, and software as well as communications electronics, including wireless two way communication for remote or semi-autonomous control, although the UAS 200 may be implemented as fully autonomous.

The control circuit 210 may include electronics necessary to carry out flight in accordance with an intended mission, whether that is remote piloted, semi-autonomous, or fully autonomous. The electronics in the control circuit 210 may be similar to those of the WTRU 102 described above with reference to FIG. 1B. The electronics may include one or more processors 118, one or more transceivers 120, one or more antennae 122, a GPS chipset 136, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. An unmanned aerial system (UAS) configured to execute a mission planned by a UAS traffic management (UTM) system, the UAS comprising:
   one or more propellers driven by a motor;
   an antenna; and
   a processor operatively coupled to the antenna;
   the antenna and the processor configured to receive a mission planning response message from the UTM, the mission planning response message indicating a sequence of waypoints in an airspace, a dynamic path conforming profile (PCP), and a dynamic required navigation performance (RNP) value for each of the waypoints, the mission planning response message further including configuration information indicating one or more trigger events; and
   the antenna and processor further configured to compare at least one RNP value during a time interval to one or more RNP values during one or more previous time intervals to determine if a trigger event of the one or more trigger events occurs;
   the antenna and the processor configured to transmit a path conformance status report to the UTM upon determining that a trigger event has occurred, the path conformance status report indicating conformance to one or more parameters specified in the PCP.

2. The UAS of claim 1, wherein a trigger event occurs when an RNP value and an offset in a current time interval are further from a threshold value than an RNP value in one or more previous time intervals.

3. The UAS of claim 1, wherein a trigger event occurs when a duration of a non-navigation event, in which the UAS does not report to the UTM, exceeds a threshold duration.

4. The UAS of claim 1, wherein a trigger event occurs when a time duration between consecutive non-navigation events, in which the UAS does not report to the UTM, falls below a threshold time duration.

5. The UAS of claim 1, wherein a trigger event occurs when an RNP error for a current time interval exceeds an average RNP error for one or more previous time intervals by a threshold error value.

6. The UAS of claim 1, wherein a trigger event occurs when an RNP error for a current time interval exceeds a threshold more than a configured number of times.

7. The UAS of claim 1, wherein a trigger event occurs when an absolute value of RNP error of the UAS exceeds a threshold error value.

8. The UAS of claim 1, wherein the one or more trigger events are indicated by the PCP.

9. The UAS of claim 1, wherein the mission planning response message is generated based on a mission planning request sent by the UAS over a first interface.

10. The UAS of claim 1, wherein the mission planning response message is generated based on a mission planning request sent by a UAS operator over a second interface.

11. A method for use in an unmanned aerial system (UAS) to execute a mission planned by a UAS traffic management (UTM) system, the method comprising:
    receiving a mission planning response message from the UTM, the mission planning response message indicating a sequence of waypoints in an airspace, a dynamic path conforming profile (PCP), and a dynamic required navigation performance (RNP) value for each of the waypoints, the mission planning response message further including configuration information indicating one or more trigger events;
    comparing at least one RNP value during a time interval to one or more RNP values during one or more previous time intervals to determine if a trigger event of the one or more trigger events occurs;
    transmitting a path conformance status report to the UTM upon determining that a trigger event has occurred, the path conformance status report indicating conformance to one or more parameters specified in the PCP.

12. The method of claim 11, wherein a trigger event occurs when an RNP value and an offset in a current time interval are further from a threshold value than an RNP value in one or more previous time intervals.

13. The method of claim 11, wherein a trigger event occurs when a duration of a non-navigation event, in which the UAS does not report to the UTM, exceeds a threshold duration.

14. The method of claim 11, wherein a trigger event occurs when a time duration between consecutive non-navigation events, in which the UAS does not report to the UTM, falls below a threshold duration.

15. The method of claim 11, wherein a trigger event occurs when an RNP error for a current time interval exceeds an average RNP error for one or more previous time intervals by a threshold error value.

16. The method of claim 11, wherein a trigger event occurs when an RNP error for a current time interval exceeds a threshold more than a configured number of times.

17. The method of claim 11, wherein a trigger event occurs when an absolute value of RNP error of the UAS exceeds a threshold error value.

18. The method of claim 11, wherein the one or more trigger events are indicated by the PCP.

19. The method of claim 11, wherein the mission planning response message is generated based on a mission planning request sent by the UAS over a first interface.

20. The method of claim 11, wherein the mission planning response message is generated based on a mission planning request sent by a UAS operator over a second interface.

* * * * *